(12) United States Patent
Staunton et al.

(10) Patent No.: US 9,096,386 B2
(45) Date of Patent: Aug. 4, 2015

(54) MULTI-MODE SCROLL CAM CONVEYOR SYSTEM

(75) Inventors: Darragh Staunton, Cambridge (DE); Roger Ketteringham, Cambridge (CA)

(73) Assignee: ATS Automation Tooling Systems Inc., Cambridge, Ontario (CA)

( * ) Notice: Subject to any disclaimer, the term of this patent is extended or adjusted under 35 U.S.C. 154(b) by 942 days.

(21) Appl. No.: 12/716,976

(22) Filed: Mar. 3, 2010

(65) Prior Publication Data

US 2010/0276255 A1 Nov. 4, 2010

Related U.S. Application Data

(60) Provisional application No. 61/202,475, filed on Mar. 3, 2009.

(51) Int. Cl.
*B65G 21/00* (2006.01)
*B65G 43/00* (2006.01)
*B23Q 7/14* (2006.01)
*B65G 33/04* (2006.01)
*B65G 35/06* (2006.01)
*B65G 54/02* (2006.01)

(52) U.S. Cl.
CPC ............. *B65G 43/00* (2013.01); *B23Q 7/1447* (2013.01); *B65G 33/04* (2013.01); *B65G 35/06* (2013.01); *B65G 35/066* (2013.01); *B65G 54/02* (2013.01)

(58) Field of Classification Search
CPC ........ B65G 43/00; B65G 35/06; B65G 33/04; B65G 35/066; B65G 54/02
USPC .......... 198/465.1, 465.2, 465.3, 467.1, 861.1; 104/167
See application file for complete search history.

(56) References Cited

U.S. PATENT DOCUMENTS

| | | | |
|---|---|---|---|
| 2,789,683 A * | 4/1957 | Stahl | 198/345.3 |
| 3,785,475 A | 1/1974 | Maynard | |
| 3,934,701 A * | 1/1976 | Mooney et al. | 198/345.3 |

(Continued)

FOREIGN PATENT DOCUMENTS

| | | |
|---|---|---|
| DE | 3737484 | 5/1989 |
| DE | 29816285 | 1/2000 |

(Continued)

OTHER PUBLICATIONS

PCT International Searching Authority (CA), International Search Report, Aug. 18, 2010, PCT/CA2010/000302.

(Continued)

*Primary Examiner* — William R Harp
(74) *Attorney, Agent, or Firm* — Dowell & Dowell, P.C.

(57) ABSTRACT

A modular multi-mode conveyor system includes at least one linear drive track section configured such that moving elements are independently controlled and moved along the track section and at least one mechanical drive track section having the same configuration as the linear drive track section but where the linear drive is replaced with a scroll cam drive system and moving elements are controlled and moved along the track section by the scroll cam drive system. The scroll cam conveyor system includes a scroll cam. The scroll cam includes a cylindrical cam, a plurality of cam grooves formed on the cylindrical cam, a drive system for rotating the scroll cam, and a moving element. The moving element includes a plurality of cam followers. The plurality of cam grooves are configured to contact with respective ones of the plurality of cam followers to move the moving element.

6 Claims, 37 Drawing Sheets

(56) References Cited

U.S. PATENT DOCUMENTS

| | | | |
|---|---|---|---|
| 4,567,979 A * | 2/1986 | Hoehn | 104/167 |
| 4,669,598 A | 6/1987 | Eitzinger et al. | |
| 4,687,091 A * | 8/1987 | Sticht | 198/345.3 |
| 4,690,066 A | 9/1987 | Morishita et al. | |
| 4,825,111 A * | 4/1989 | Hommes et al. | 310/12.15 |
| 5,097,935 A | 3/1992 | Weiss | |
| 5,145,047 A * | 9/1992 | Terracol et al. | 198/341.02 |
| 5,197,915 A | 3/1993 | Nakamura et al. | |
| 5,280,830 A * | 1/1994 | Schiaretti et al. | 198/465.3 |
| 6,011,508 A | 1/2000 | Perreault et al. | |
| 6,082,256 A * | 7/2000 | Hellmeier et al. | 101/35 |
| 6,101,952 A | 8/2000 | Thornton et al. | |
| 6,148,721 A * | 11/2000 | Hellmeier et al. | 101/35 |
| 6,170,632 B1 * | 1/2001 | Shimura et al. | 198/334 |
| 6,191,507 B1 | 2/2001 | Peltier et al. | |
| 6,378,694 B1 | 4/2002 | Onoyama et al. | |
| 6,459,061 B1 | 10/2002 | Kugle et al. | |
| 6,499,701 B1 | 12/2002 | Thornton et al. | |
| 6,578,495 B1 | 6/2003 | Yitts et al. | |
| 6,758,320 B1 | 7/2004 | Tegel | |
| 6,781,524 B1 | 8/2004 | Clark et al. | |
| 6,851,543 B2 * | 2/2005 | Nakanishi | 198/459.4 |
| 6,876,107 B2 | 4/2005 | Jacobs | |
| 6,876,896 B1 | 4/2005 | Ortiz et al. | |
| 6,917,136 B2 | 7/2005 | Thornton et al. | |
| 6,983,701 B2 | 1/2006 | Thornton et al. | |
| 7,014,033 B2 | 3/2006 | Sticht et al. | |
| 7,021,450 B2 | 4/2006 | Jones, Jr. | |
| 7,066,318 B2 * | 6/2006 | Kato | 198/465.1 |
| 7,134,258 B2 | 11/2006 | Kalany et al. | |
| RE39,747 E | 7/2007 | Peltier et al. | |
| 7,448,327 B2 | 11/2008 | Thornton et al. | |
| 7,458,454 B2 | 12/2008 | Mendenhall | |
| 7,538,469 B2 | 5/2009 | Thornton et al. | |
| 7,859,139 B2 | 12/2010 | Jacobs | |
| 7,926,644 B2 | 4/2011 | Mendenhall | |
| 8,074,578 B2 | 12/2011 | Thornton | |
| 8,076,803 B2 | 12/2011 | Jacobs | |
| 2002/0079254 A1 | 6/2002 | Soldavini et al. | |
| 2003/0230941 A1 | 12/2003 | Jacobs et al. | |
| 2010/0186618 A1 | 7/2010 | King et al. | |
| 2010/0213031 A1 | 8/2010 | Krech et al. | |
| 2010/0236445 A1 | 9/2010 | King et al. | |
| 2013/0008336 A1 | 1/2013 | Young et al. | |
| 2013/0035784 A1 | 2/2013 | Jacobs | |
| 2013/0074724 A1 | 3/2013 | King et al. | |

FOREIGN PATENT DOCUMENTS

| | | |
|---|---|---|
| EP | 0620080 | 10/1994 |
| EP | 1882545 A | 5/2007 |
| EP | 1882545 A2 | 1/2008 |
| FR | 2559086 A1 | 8/1985 |
| WO | 2008008029 A1 | 1/2008 |
| WO | 2012012906 | 2/2012 |

OTHER PUBLICATIONS

PCT International Searching Authority (CA), The Written Opinion of International Searching Authority, Aug. 18, 2010, PCT/CA2010/000302.

PCT International Searching Authority (CA), International Search Report, Jul. 14, 2010, PCT/CA2010/000301.

PCT International Searching Authority (CA), The Written Opinion of International Searching Authority, Jul. 14, 2010, PCT/CA2010/000301.

European Patentoffice; Extended European Search Report, EU Application No. 10748262.2, dated Feb. 8, 2012.

English Abstract of EP 0620080, Application No. EP19940100322, Feb. 23, 2012, espace.net.

PCT International Searching Authority, International Search Report and Wriiten Opinion dated Jul. 4, 2012, for PCT Patent Application PCT/CA2012/050197.

United States Patent and Trademark Office, Non-Final Office Action on U.S. Appl. No. 13/787,903, dated May 30, 2013.

United States Patent and Trademark Office, Final Office Action on U.S. Appl. No. 13/787,903, dated Nov. 25, 2013.

\* cited by examiner

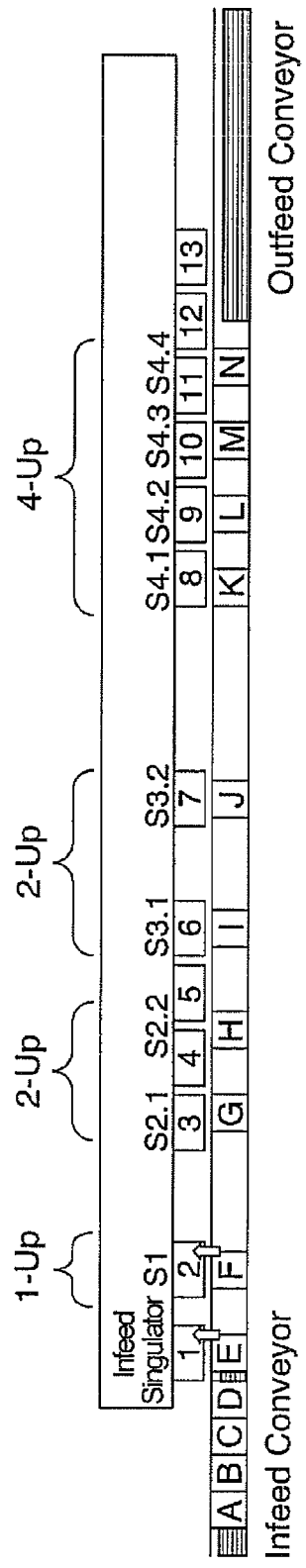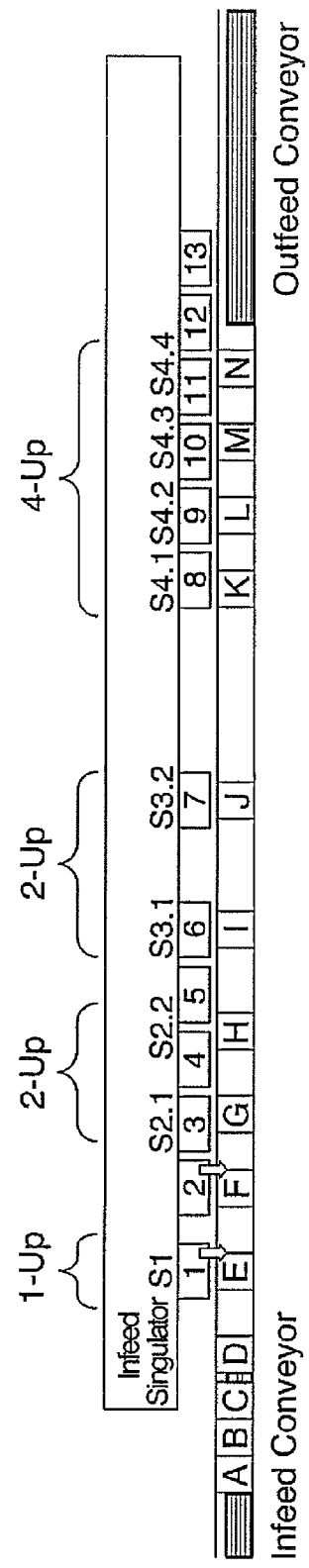

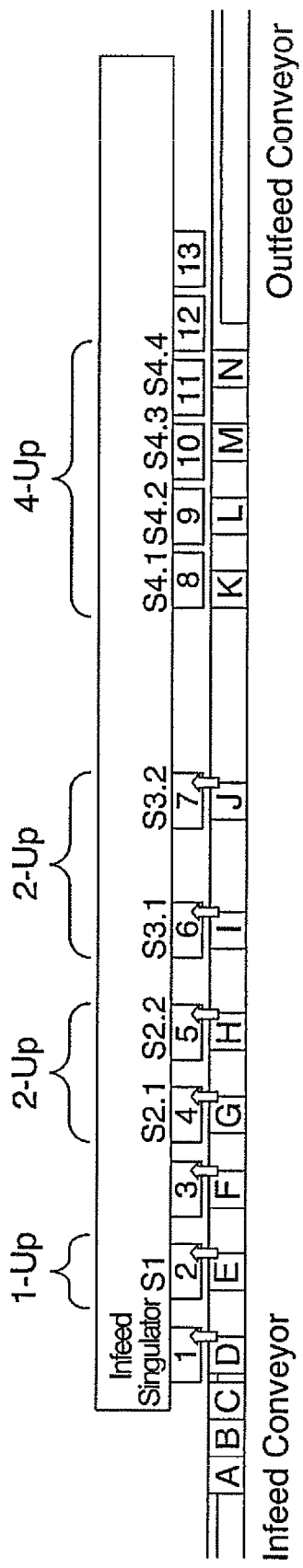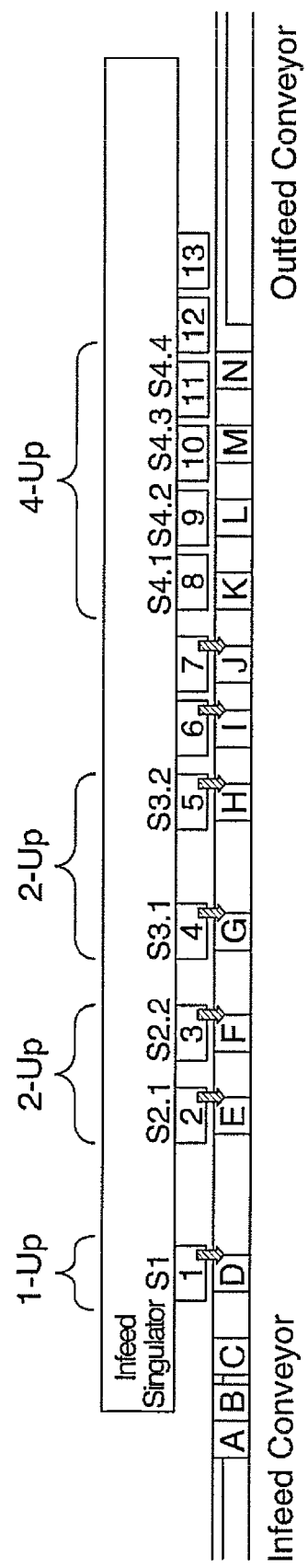
FIG.9C
FIG.9D

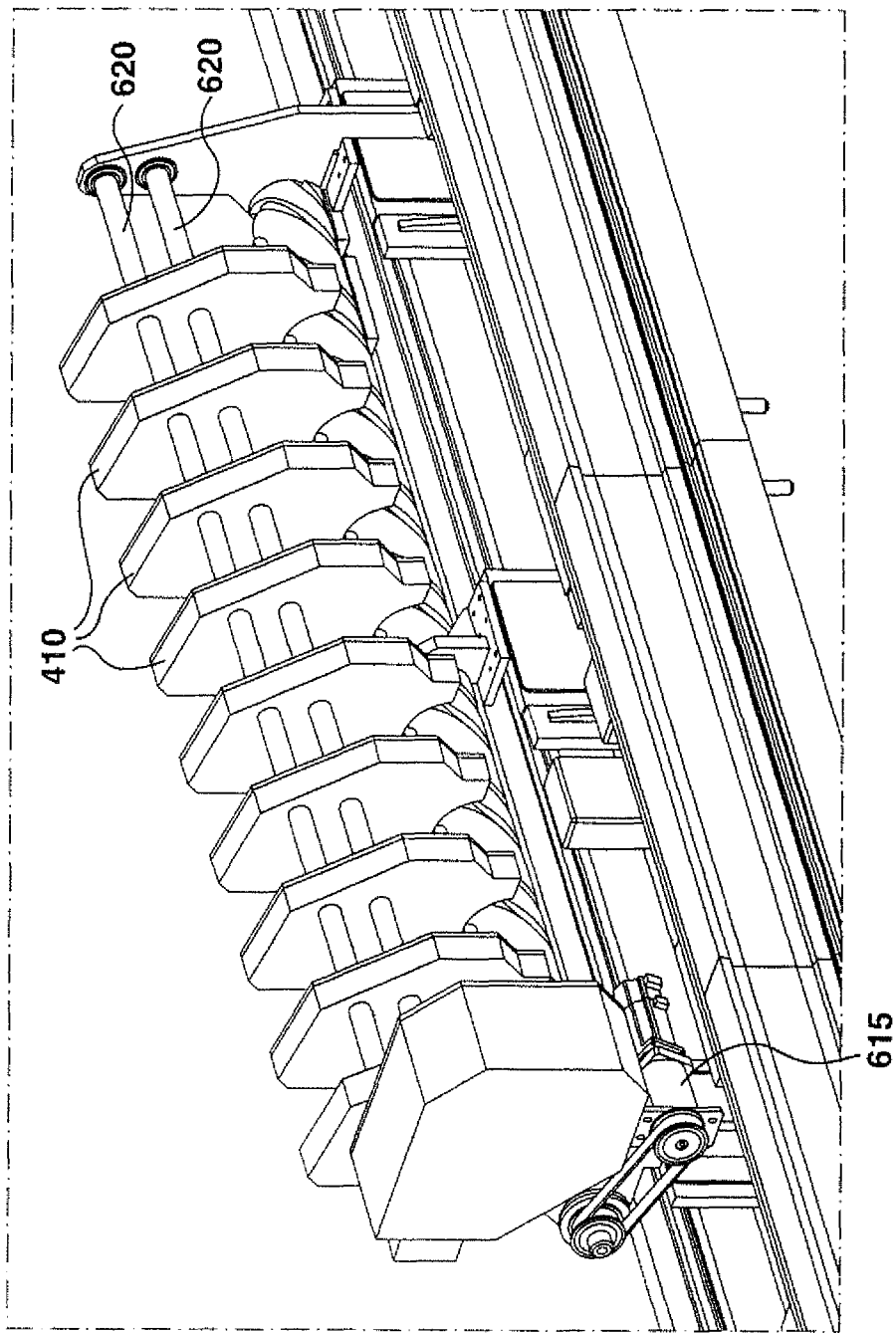

MULTI-MODE SCROLL CAM CONVEYOR SYSTEM

This application claims the benefit of priority of U.S. Provisional Patent Application No. 61/202,475 filed Mar. 3, 2009, which is incorporated herein by reference in its entirety.

FIELD

This application generally relates to conveyor systems and methods, and more specifically to modular conveyor systems and methods that provide integration with conventional conveyor systems and multiple moving elements under independent control that allow for multiple pitch movement of pallets.

BACKGROUND

There are a number of fundamental limitations with conventional mechanical conveyor systems such as those which employ a belt for transporting pallets between processing stations. First, the speed of the belt is typically quite limited. This is largely due to the fact that the pallets are typically stopped by mechanical stop mechanisms, e.g., in order to be processed at a processing station. Thus, if the belt conveyor is operated at a high speed, the strong impact between a pallet and mechanical stop is likely to jar whatever parts the pallet may be carrying for processing. Second, it is generally not possible to vary the acceleration and velocity profiles for individual pallets. For instance, if a first pallet is empty and a second pallet is loaded with delicate parts, it is generally not possible to aggressively accelerate the first pallet to a high speed while controlling the second pallet using more gentle acceleration and a differing velocity profile. This limitation may affect the latency and the throughput of the manufacturing line because empty pallets will generally have to flow through at the same rate as the loaded pallets. Third, a belt conveyor is typically not bidirectional, which may result in a suboptimal design of the manufacturing line. Fourth, the belt conveyor typically provides limited flexibility or programmability, such as being able to have multiple stopping locations at one processing station or being able to very quickly change the positions of processing stations when the line is adjusted/changed. Finally, the data acquisition capabilities provided by the belt conveyor are typically quite limited. For example, it is typically not possible to know where the pallets and their constituent loads are located along the conveyor at all times. Thus, for instance, it may be difficult to know how many pallets are queued at a particular processing station.

Conventional conveyor systems making use of scroll cams are also known but have some limitations as well. For example, scroll cam systems may have or develop reduced postional repeatability due to existing or developed play in the cam grooves. Scroll cam systems also have generally no or very limited flexibility or programmability.

For these and other reasons, a conveyor system having multiple moving elements or pallets under substantially independent control may be desirable for various types of applications.

Conveyor systems having multiple pallets under substantially independent control are known in the art, but suffer from a variety of limitations. For example, in some cases involving linear motors, the carts or pallets cannot be positioned to stop at any point along the conveyor, but only where linear motors are disposed. This makes changing the location of a station a troublesome endeavour. In addition, it is difficult to pinpoint the location of a moving pallet at any time.

In another conventional system involving a moving-magnet type linear d.c. brushless motor having plural moving elements disposed for motion along a track, the fact that a separate track of position/commutation sensors is required for each moving element means that the system can only accommodate a relatively small number of moving elements. Second, the length of the linear motor is limited by a servo-control mechanism, described as a single microcomputer, which can only process and accommodate a limited number of the position/commutation sensors and associated electric current generating control circuitry. Third, the winding arrangement of the stator armature is essentially that of a linear stepper motor, which presents an uneven magnetic reluctance along the stator armature resulting in relatively noticeable cogging effects and a jerky thrust production. Finally, the, coreless design of the stator armature also results in a relatively low average thrust production which may not be suitable for typical conveyor system applications.

Some conventional conveyor systems that have independent control have drawbacks with regard to space limitations and/or material requirements. For example, some magnetic oriented conveyors are not able to bypass rejects or empty pallets or bypass an unload station when a reject or empty pallet is discovered. Some conventional conveyor systems require a larger footprint because of requirements that an entire loop be available for pallet movement or extra modules are needed for part loading/unloading stations.

While independently controlled conveyor systems can have various benefits, cost concerns will often dictate a need for lower priced conventional mechanical conveyors, depending on the conveying application involved.

SUMMARY

Accordingly, there is a need for improved apparatuses, systems and methods for conveying which allow for multi-mode conveying, multi-pitch movement of materials, and improved mechanical conveyors.

According to one aspect herein, there is provided a conveyor system comprising: a track section comprising a control system; a drive system that is controlled by the control system; a plurality of moving elements that are driven by the drive system; a pallet support apparatus; a plurality of pallets that are configured to engage with the moving elements and move on the pallet support apparatus; and a plurality of workstations provided along the track section, each workstation at a predetermined pitch from each other workstation, wherein at least some of the pitches are different among workstations, wherein the control system, drive system and moving elements are configured such that each pallet of the plurality of pallets is independently advanced through the workstations based on the pitches of the workstations.

In a particular case, each workstation may have a predetermined cycle time and at least some of the cycle times may be different among workstations and wherein the control system, drive system and moving elements may be configured such that each pallet of the plurality of pallets is independently advanced through the workstations based on the cycle times of the workstations.

In a particular case, the drive system may comprise a magnetic drive system and each moving element may comprise a magnetic conductor.

In another particular case, each workstation may be provided with a workstation locking mechanism that is configured to lock a pallet in position at the workstation for the cycle time. In this case, the workstation locking mechanism may first lock the pallet in position prior to releasing engagement with the moving element and allow engagement of the moving element prior to releasing the pallet.

In still another case, an upper runner and a lower runner may support the moving elements on the track section. The upper runner may be angled to provide pressure holding the moving elements between the upper runner and the lower runner.

In some cases, the workstations comprise workstations with multiple pallet locations to operate on more than one pallet at a time in order to adjust for differing cycle times.

In some cases, the control system comprises a moving element tracking system comprising: an encoder strip provided to the moving element; a plurality of encoder read heads provided to the track section and configured to read the encoder strip as moving elements move past the location of the encoder read heads. In this case, the encoder strip comprises a plurality of index points staggered along the strip.

According to another aspect, there is provided a conveyor system comprising: an infeed station comprising: a singulator provided to hold pallets received from an infeed conveyor and release them singly from the infeed section; a track section in communication with the infeed station, the track section comprising: a plurality of moving elements configured to engage with pallets from the infeed section; a track; a workstation; a control system configured to independently control the moving elements for movement along the track to and from the workstation; and an outfeed station configured to receive pallets from the track section and feed the pallets to an outfeed conveyor, which is in communication with the track section, for additional processing.

In some cases, the track comprises a magnetic drive system.

In some cases, the moving elements the moving elements engage and disengage with the pallets via an engagement system comprising: a moving element portion that is biased to be engaged but can be disengaged at a workstation; and a workstation portion provided at the workstation and configured such that, when the moving element enters the workstation the workstation element disengages the moving element from the pallet.

In some cases, the moving elements engage and disengage with the pallets via an engagement system comprising: a frame provided to the moving element; a movable pin provided to the frame that is biased toward the engagement position; a movable cam mechanism provided at the workstation that, when advanced, is configured to operate against the bias to retract the movable pin for disengagement with the pallet, and, when retracted, allows the movable pin to engage with the pallet.

In some cases, the workstation further comprises: a workstation locking mechanism that, when activated, locks the pallet in position at the workstation, wherein the workstation locking mechanism is configured to operate with the cam mechanism such that the pallet is engaged with either of the workstation or the moving element at all times.

According to yet another aspect herein, there is provided a modular multi-mode conveyor system comprising: at least one linear drive track section configured such that moving elements are independently controlled and moved along the track section; and at least one mechanical drive track section having the same configuration as the linear drive track section but wherein the linear drive is replaced with a scroll cam drive system and moving elements are controlled and moved along the track section by the scroll cam drive system.

In a particular case, the modular conveyor may further comprise a control system for monitoring the movement of moving elements, wherein the control system includes a moving element tracking system comprising: an encoder strip provided to the moving element; a plurality of encoder read heads provided to the track section and configured to read the encoder strip as moving elements move past the location of the encoder read heads.

In another particular case, the scroll cam drive system may include: a cylindrical cam; a plurality of cam grooves formed on the cylindrical cam; a drive system for rotating the scroll cam; and each moving element comprises: a plurality of cam followers; wherein the plurality of cam grooves are configured to contact with respective ones of the plurality of cam followers to move the moving elements. In this case, the cam grooves may be configured to provide a period in which a moving element is not driven even though the scroll cam is rotating.

In another particular case, the linear drive track section may include a magnetic drive system.

According to still yet another aspect herein, there is provided a scroll cam conveyor system comprising: a scroll cam including: a cylindrical cam; a plurality of cam grooves formed on the cylindrical cam; a drive system for rotating the scroll cam; and a moving element comprising: a plurality of cam followers, wherein the plurality of cam grooves are configured to contact with respective ones of the plurality of cam followers to move the moving element.

In a particular case, the cam grooves are configured to provide a period in which a moving element is not driven even though the scroll cam is rotating.

In another particular case, the scroll cam conveyor system may further comprising a control system for monitoring the movement of moving elements, wherein the control system includes a moving element tracking system comprising: an encoder strip provided to the moving element; and a plurality of encoder read heads provided to the track section and configured to read the encoder strip as moving elements move past the location of the encoder read heads.

According to yet another aspect herein, there is provided a method of developing a cam profile for a cam driven system comprising a disk cam and a cam follower for converting the disk cam motion into linear motion in order to drive a driven device, the method comprising: providing a linear actuator in contact with the cam follower at a location spatially related to the position of the disk cam; providing a processor to control the movement of the linear actuator; determining an initial movement profile for movement of the linear actuator; adjusting the initial movement profile based on experimental runs of the driven device to develop a final movement profile; calculating a cam profile based on the final movement profile; and outputting the cam profile for use in forming a disk cam.

BRIEF DESCRIPTION OF DRAWINGS

The drawings included herewith are for illustrating various examples of articles, methods, and apparatuses of the present specification and are not intended to limit the scope of what is taught in any way. In the drawings:

FIGS. 9A to 9I illustrate the conveyor system in various positions and providing multi-cycle, multi-pitch movement;

FIGS. 14A-14D illustrate a single drive scroll cam and pick and place system.

DESCRIPTION

Numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein. The embodiments described herein are not intended to be limited to the specific details of any one example embodiment or to specific details that may be common to multiple, or all, example embodiments. The applicants, inventors or owners reserve all rights that they may have in any embodiments disclosed herein, for example the right to embodiments claimed in a continuing application, and do not intend to abandon, disclaim or dedicate to the public any such embodiments by disclosure of this document.

Figure 1:
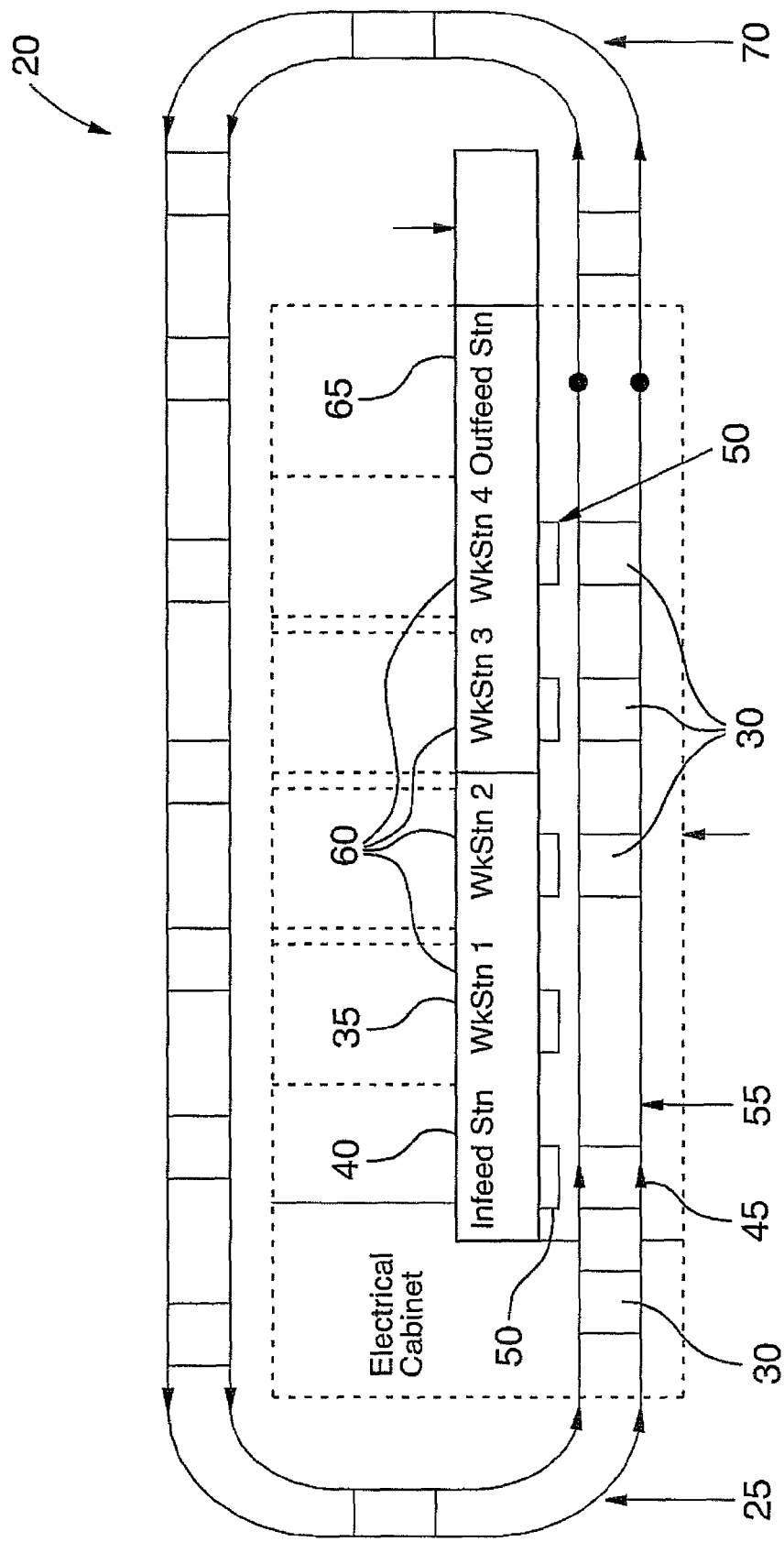
FIG. 1 is a schematic diagram of a modular conveyor system.

FIG. 1 shows a general schematic diagram of a modular conveyor system 20, which will be used to provide a general description of the system.

The system 20 includes an infeed conveyor 25, which delivers pallets 30 to a track section 35. The infeed conveyor 25 may be, for example, a belt conveyor, conveyor known in the art, or the like. As the pallets 30 arrive at an infeed station 40, they are detected and held at the infeed station 40 by a holding mechanism 45, such as a gate, lock or the like. In fact, several pallets 30 may be held at the infeed station 40 depending on the operating status of the system 20. A moving element 50 mounted on the track section 35 engages with the pallet 30 at the infeed station 40 and, after release from the holding mechanism 45, the moving element 50 moves the pallet 30 onto a pallet rail 55 that is positioned adjacent the track section 35 and transports the pallet 30 in an independently controlled manner to a workstation 60. As will be understood, the pallet 30 may include some means (not shown) to reduce friction on the pallet rail 55 to allow the moving element 50 to move the pallet 30. At the workstation 60, the pallet 30 is accurately positioned by the moving element 50 and then held in a place by a locking mechanism (not shown in FIG. 1) provided at the workstation 60. The workstation 60 typically includes an apparatus (not shown) such that an operation, for example a pick and place or other operation, can be performed on a workpiece (not shown), such as a part, device or the like that is being carried by the pallet 30. While the pallet 30 remains at the workstation 60, the moving element 50 can be disengaged from the pallet 30 and is free to move and collect a subsequent pallet 30 while another moving element 50 may return to connect with the pallet 30 at the workstation 60. In this way, the movement of each pallet 30 from workstation 60 to another workstation 60 is carried out by moving a plurality of moving elements 50 along the track section 35, each moving element 50 being independently controlled.

In situations where multiple operations are performed while a particular pallet 30 is at a workstation 60 (multi op), the moving element 50 may remain engaged with the pallet 30 while the pallet 30 is at the workstation 60 and can provide any x-axis movement required for the operations. In this situation, it will be understood that the moving element 50 which moves the pallet 30 to the first workstation 60 could remain engaged with the pallet 30, in which case the moving element 50 would return to collect a new pallet 30 after the operations are completed. Alternatively, a second moving element 50 could engage with the pallet 30 for the various operations. The particular arrangement will depend on the timing of operations at different workstations 60 along the track section 35.

Generally speaking, each pallet 30 may then be moved/indexed independently and accurately through any number of workstations 60 (four shown) and via any number of track sections 35 (two shown).

At the end of all workstations 60, each pallet 30 is moved to an outfeed station 65 where it is moved onto an outfeed conveyor 70 by a moving element 50 and is disengaged. This releases the pallet 30 to be carried by the outfeed conveyor 70 to the next processing operations (not shown). In some embodiments, a sensor (not shown) may be provided at the outfeed station 65 or on the outfeed conveyor 70 to monitor a buffer to the next processing cell in order to slow or stop the conveyor system 20 if the buffer is full or becoming full. As with the infeed conveyor, the outfeed conveyor may also be a conventional conveyor such as a belt conveyor or the like.

This combination of conventional infeed and outfeed conveyors with the independently controlled track sections provides for a lower cost modular conveyor system because it makes use of cheaper, conventional pallets 30 and a limited number of independently-controlled moving elements 50 for each of the track sections 35. The use of cheaper conventional conveyor types also allows flexibility in design of manufacturing lines by allowing operations that do require detailed control to be performed on the track section and operations that do not require as much detailed control to be performed on the conventional conveyor.

The modularity and independent control provided by the track sections 35 also make it easier to retool the modular conveyor system 20 as each workstation 60 can be provided at any point along the track section 35 and can be adjusted quite easily based on the independent control. Further, the modularity allows for a plurality of track sections 35 to be included together to provide as large a processing area as needed for a particular process and the flexibility to adjust the layout as needed.

Figure 2:
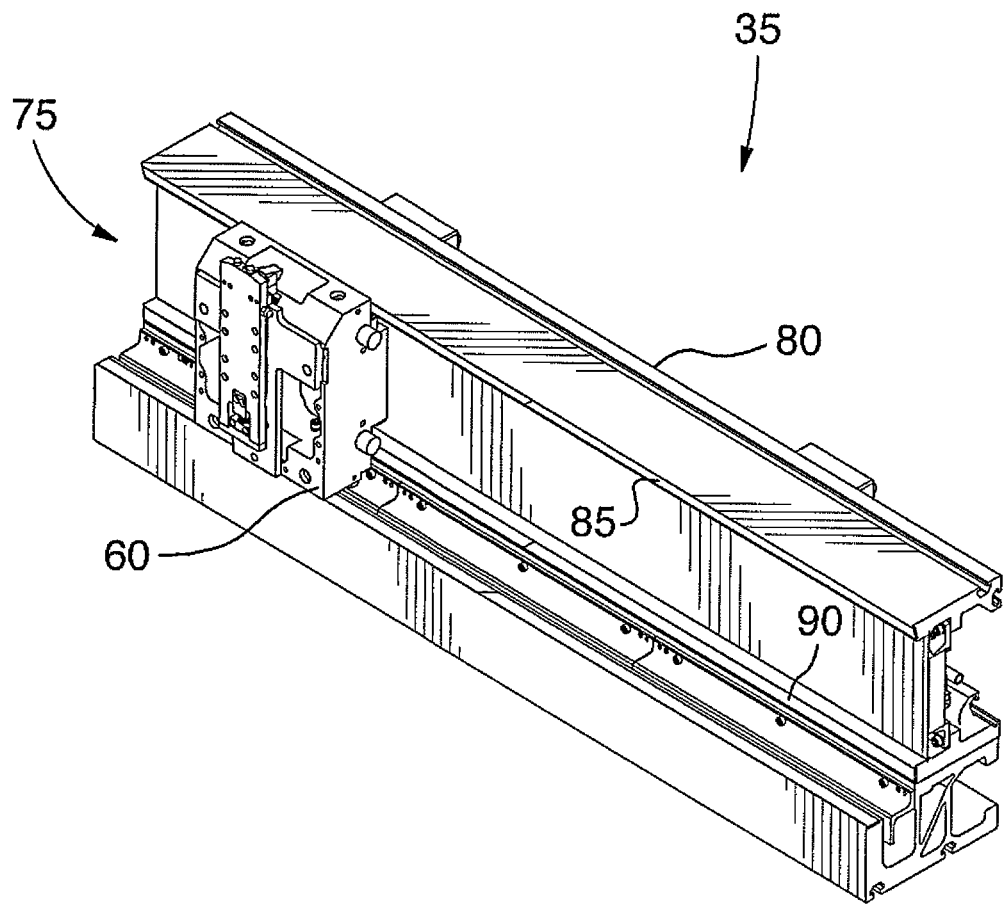
FIG. 2 is a perspective view of a track section of the modular conveyor system of FIG. 1.

FIG. 2 illustrates a track section 35 of the modular conveyor system 20. The track section 35 features one or more moving elements 50 (only one is illustrated) which are configured to ride or travel along a track 75. The track 75 includes a frame 80 configured to support the moving element 50 on an upper runner 85 and lower runner 90. Some of the principles of operation of the track section 35 are described in more detail in U.S. Pat. RE39,747 to Peltier, which is hereby incorporated herein by reference.

The modular conveyor system 20 can be composed of a plurality of track sections 35 which are mechanically self-contained and quickly and easily separable from one another so as to be modular in nature. In this embodiment, the track sections 35 are mounted on a support (not shown) so as to align and abut one another in order to form a longer track. In order to be modular, each track section 35 preferably houses all of the electronic circuitry required to power and control the track section 35.

Figure 3:
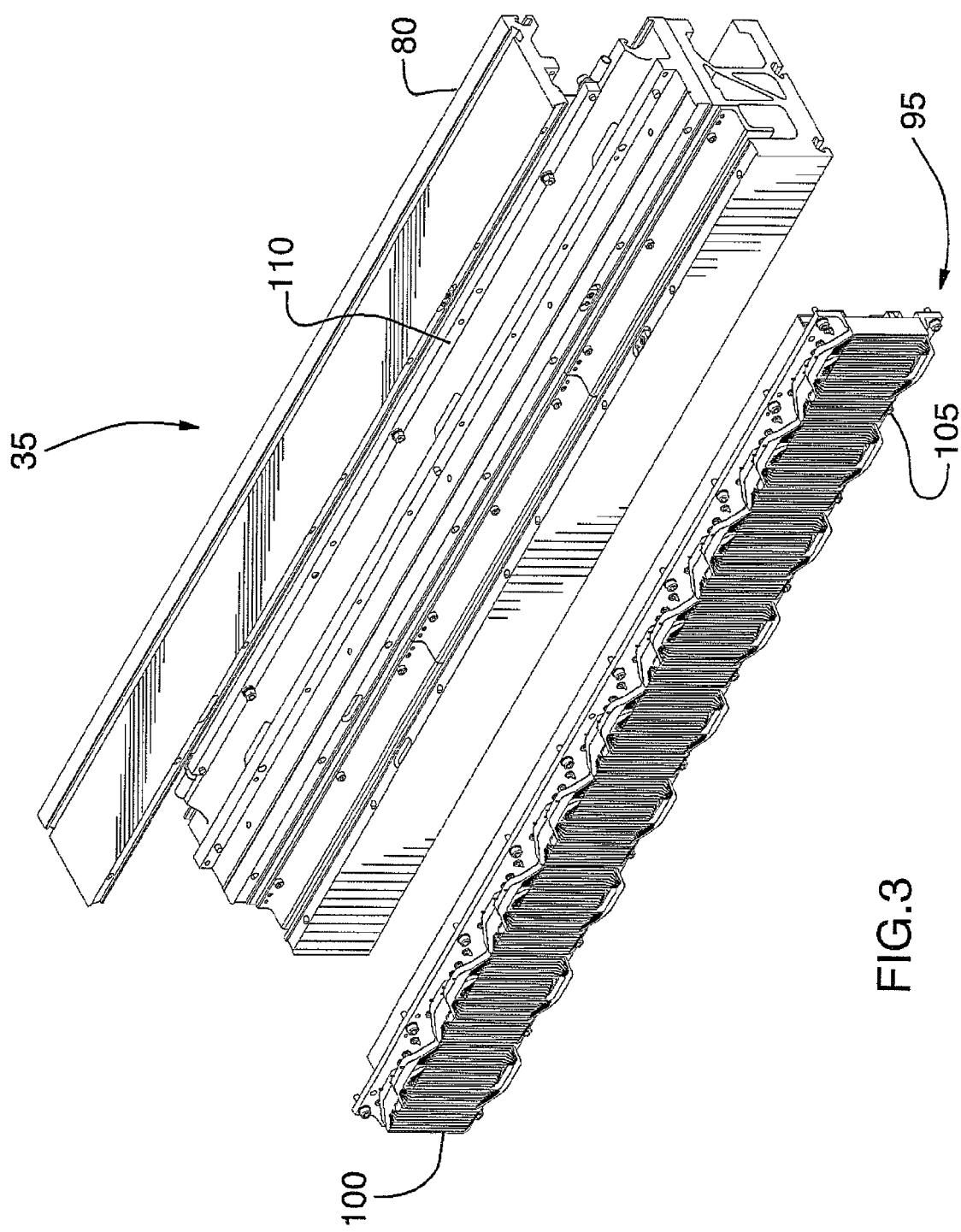
FIG. 3 is an expanded view of the track section of FIG. 2.

FIG. 3 illustrates an expanded view of the track section 35. The frame 80 houses a linear drive mechanism 95 that is formed as a stator armature 100 comprising a plurality of embedded coils 105 which are individually excited so that an electrically-induced magnetic flux produced by the stator armature 100 is located adjacent to a given moving element 50 to be controlled, in a direction normal thereto, without affecting adjacent moving elements 50. The coils 105 are arranged as a sequence of individual polyphase-like windings or coil sets, wherein coils in each set are overlapped such that the coil centres are spaced apart. The frame 80 also includes a bus bar 110 to provide power to the stator armature 100. The motive force for translating each moving element 50 arises from the magnetomotive (MMF) force produced by each moving element 50 and the stator armature 100, i.e., by the tendency of the corresponding magnetic fluxes provided by the stator armature 100 and moving element 50 to align. A servocontrol system (described below) enables separate and independent moving MMFs to be produced along the length of the track section 35 for each moving element 50 so that each moving element 50 can be individually controlled with a trajectory profile that is generally independent of any other moving element 50. Structurally, the track section 35 may thus be broadly classified as a moving-magnet type linear brushless motor having multiple moving elements 50.

Figure 4A:
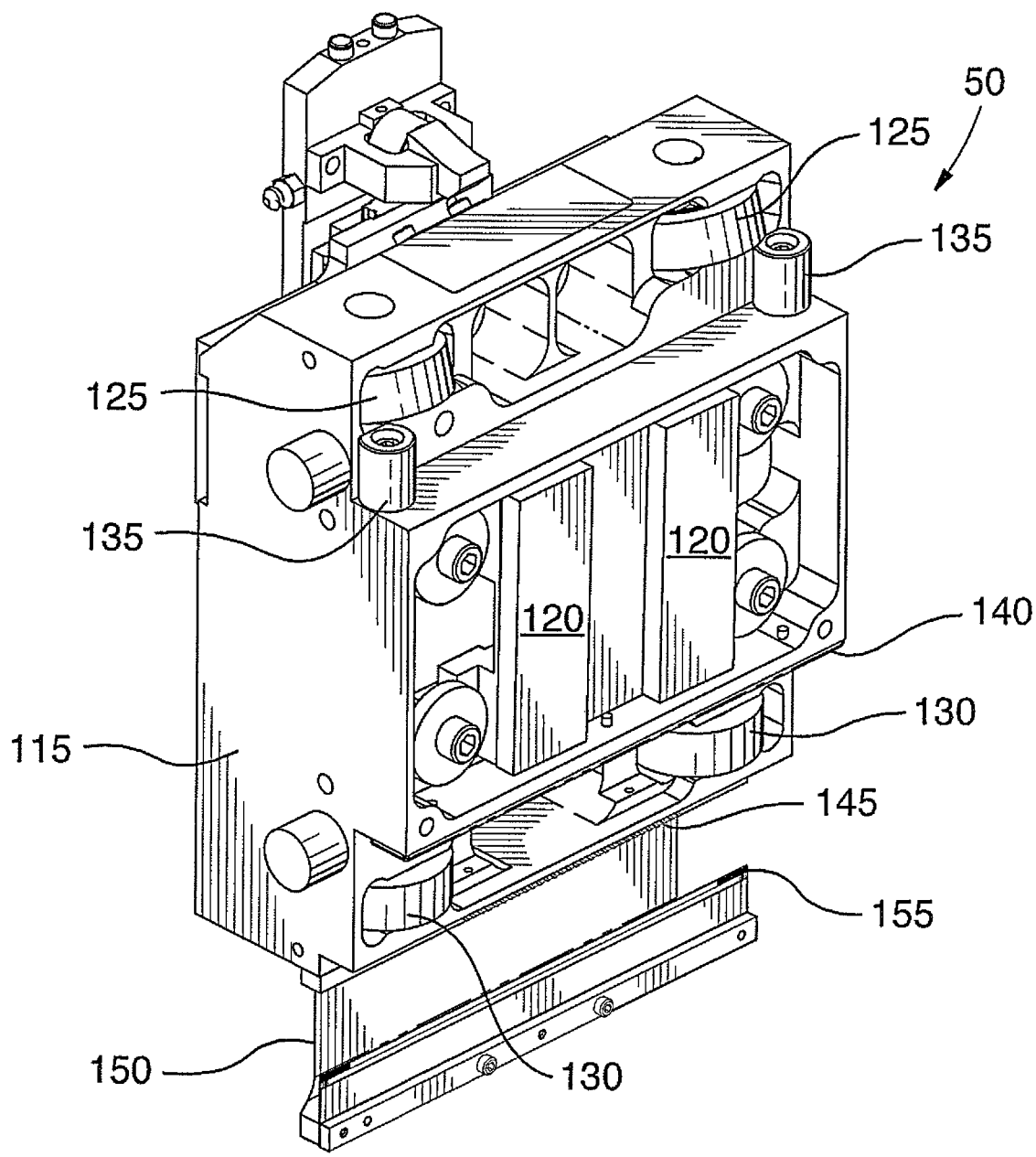
FIGS. 4A and 4B are perspective views of a moving element of the track section of FIG. 2.
Figure 4B:
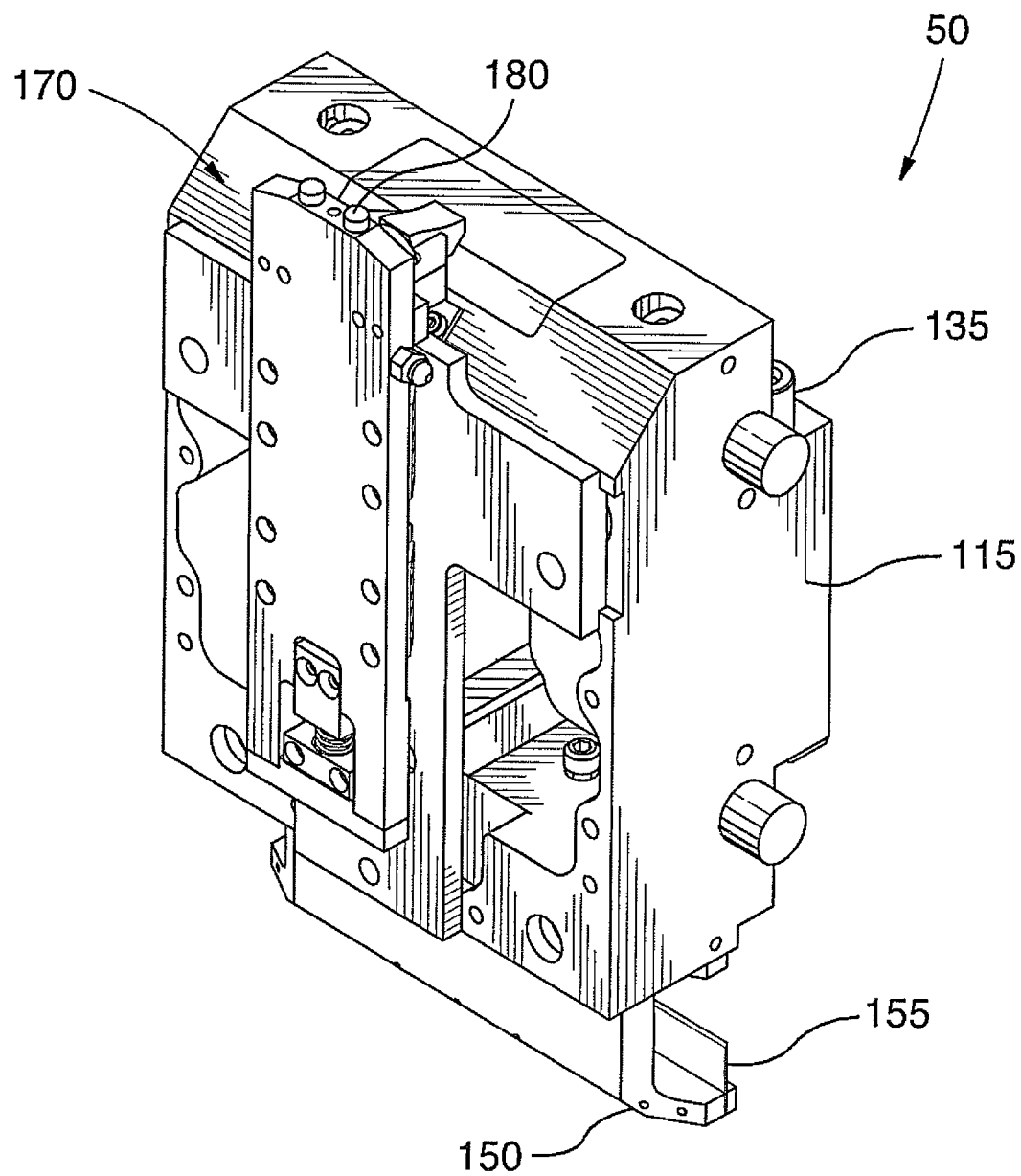
Figure 5:
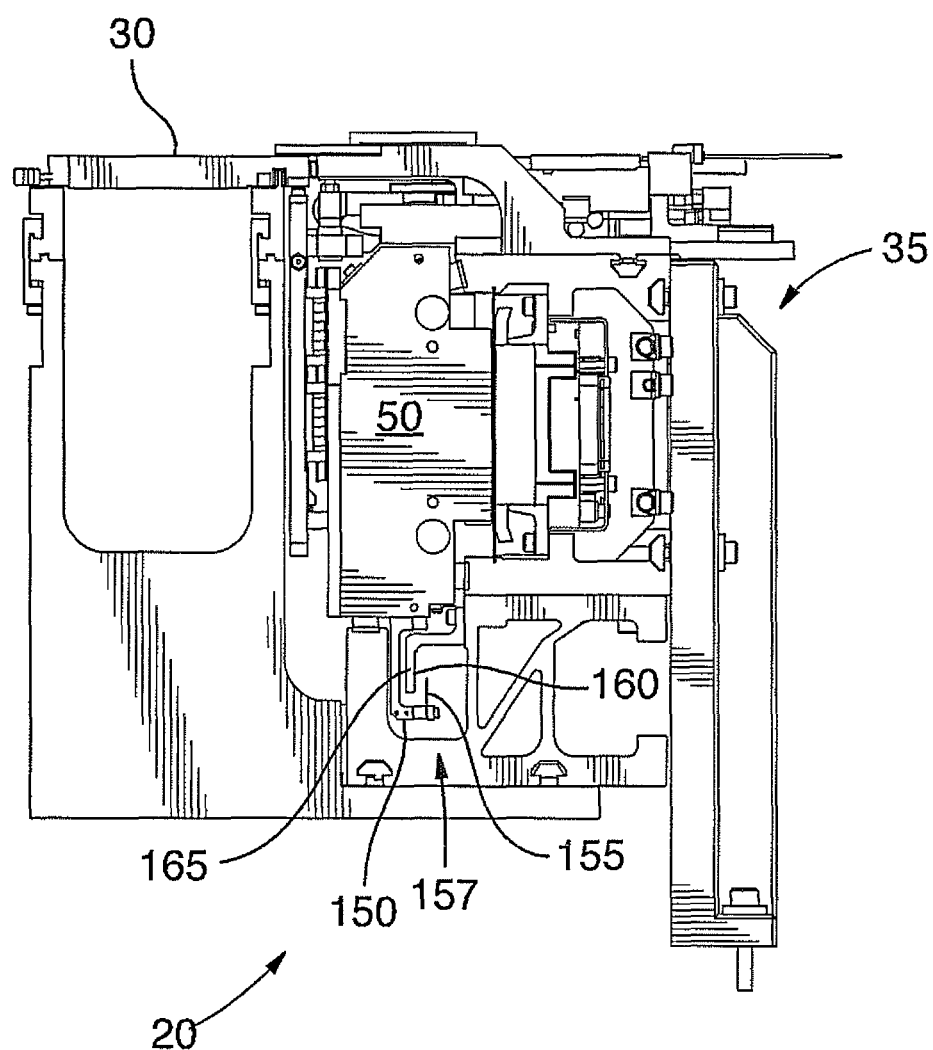
FIG. 5 is a sectional view of the track section, moving element and part pallet.

FIGS. 4A and 4B illustrate perspective views of the moving element 50 and FIG. 5 shows a sectional view of the track section 35, moving element 50 and pallet 30. As shown in FIG. 4A, each moving element 50 includes a body 115 which houses one or more permanent magnets 120 disposed to provide a magnetic flux orientated normal to the track section 35. In the example configuration of FIG. 4A, the magnetic structure of each moving element 50 comprises two thrust-producing permanent magnets 120 arranged in alternating North-South sequence. The permanent magnet material, which may include Neodymium-Iron-Boron, Alnico and ceramic (ferrite) base magnets, is generally selected on the basis of air gap flux densities required and the physical dimensions of the moving element 50 magnetic structure.

As shown in FIGS. 4A, 4B and 5, each moving element 50 features upper wheels 125 and lower wheels 130 which ride along upper and lower runners 85, 90 of track 75. In this particular embodiment, the upper wheels 125 are angled to match with the angled upper runner 80 to provide a downward force on the moving element 50 and help prevent the moving element 50 from separating from the track 75. It will be understood that alternate arrangements may provide the same functionality. The moving element 50 is also provided with anti-tip blocks 135 that can interact with the frame 80 to help prevent the moving elements 50 from tipping if there is a collision or the like. The moving element 50 may also include static brushes 145 that assist with dissipating any build up of static electricity.

As further seen in FIGS. 4A and 5, each moving element 50 includes an extension 150 onto which is mounted an encoder strip 155, which may be, for example, an optically transmissive or reflective strip, a magnetic strip, other type of feedback system or the like. The extension 150 is configured such that the encoder strip 155 interacts with encoder read heads 160 mounted to a corresponding extension 165 extending from the track 75 (see FIG. 5). The encoder read heads 160 are configured to read the encoder strip 155, whether optically, magnetically or otherwise. The encoder strip 155 and encoder read heads 160 form an encoder system 157. The inter-engaging structure is intended to protect the encoder system 157 from the traffic on the track 75 and dust and other debris. The encoder system 157 is employed in the moving element position-detecting subsystem explained in greater detail below. At this point, it should be appreciated that by placing the encoder read heads 160 on track 75 and not on moving elements 50, the moving elements 50 are not tethered in any way and thus their mobility is not restricted.

As seen in FIG. 4B, the moving element 50 also includes an engagement mechanism 170 that allows the moving element 50 to engage with the pallets 30 (also referred to as the moving element portion of the pallet engagement mechanism). In this particular embodiment, the engagement mechanism 170 includes a mounting plate 175 (also referred to as a frame) provided with pins 180. The mounting plate 175 is spring-biased such that pins 180 are in an extended position above the moving element 50. The engagement mechanism 170 is described in further detail below with regard to FIGS. 6A and 6B. It will be understood by those of skill in the art that alternate engagement mechanisms may also be contemplated, including non-contact engagement mechanisms such as magnetic engagement mechanisms.

Figure 6A:
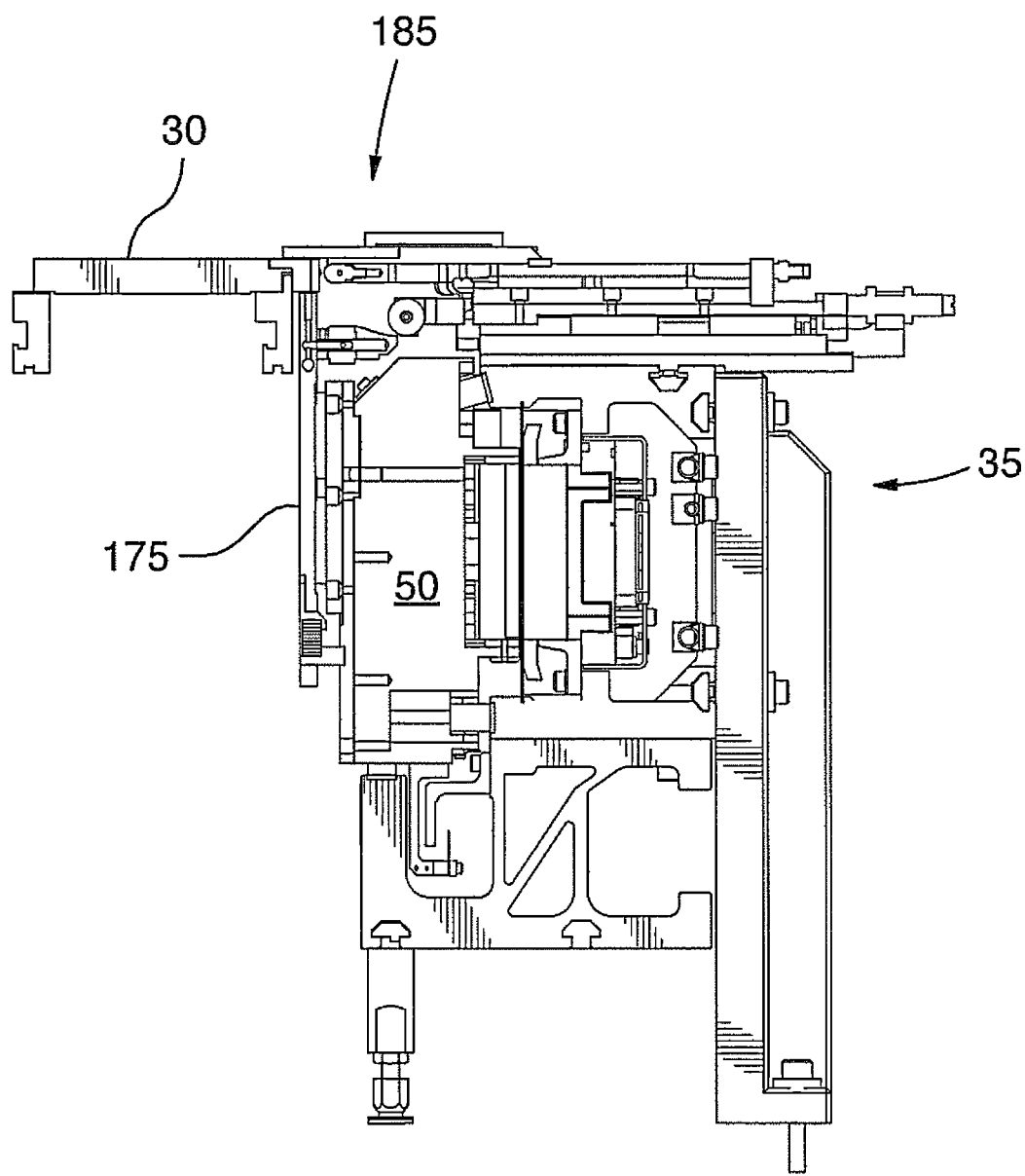
FIGS. 6A and 6B are sectional views of the track section, moving element and pallet showing engagement of the moving element with the pallet.
Figure 6B:
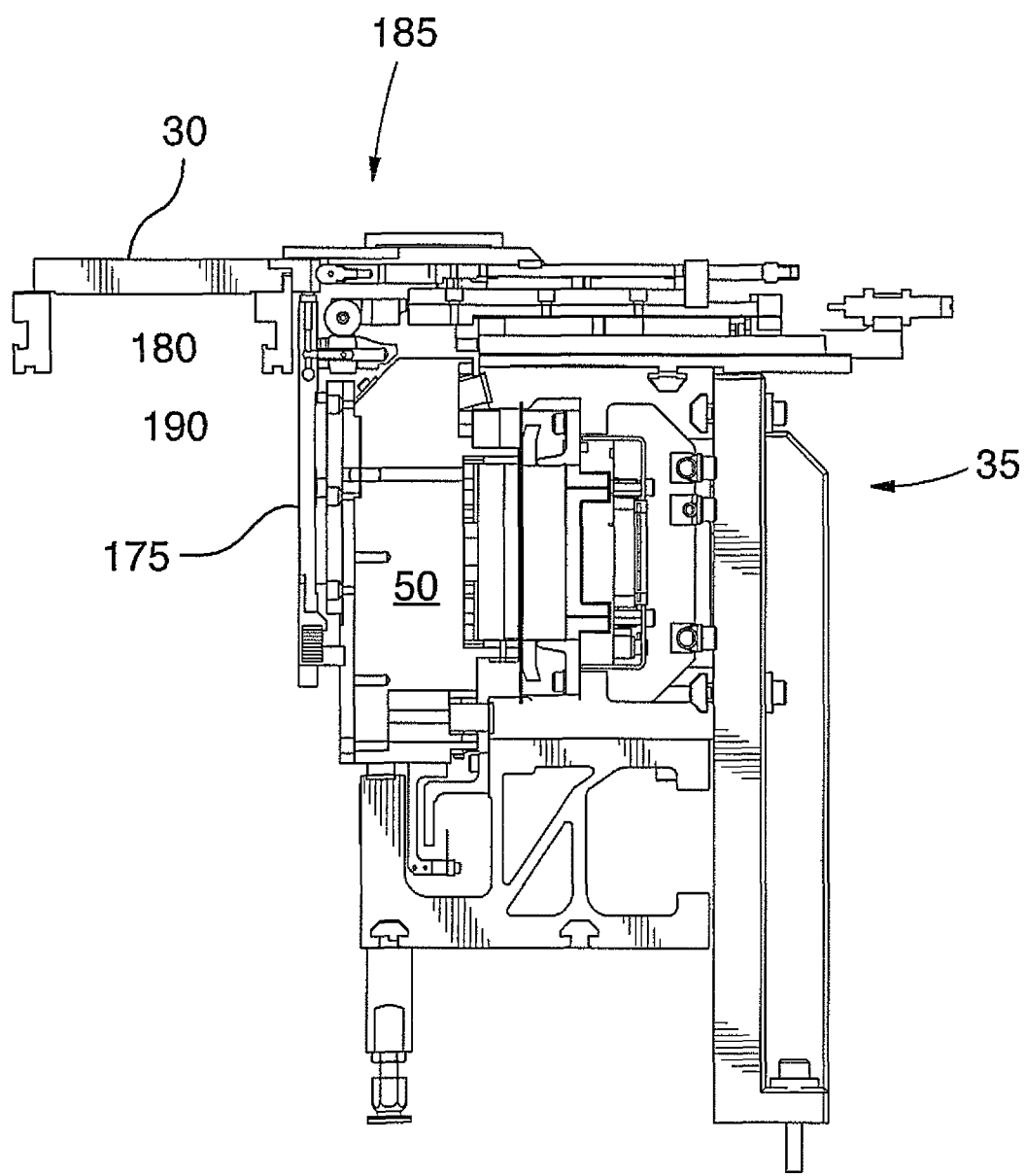

FIGS. 6A and 6B illustrate the disengagement of the moving element 50 and the pallet 30 at the workstation 60. As shown in FIG. 6A, the moving element 50 arrives at a workstation 60 engaged with a pallet 30. As a first stage, a workstation locking mechanism 185 engages with the pallet 30 to hold the pallet 30 in place adjacent the workstation 60. In FIG. 6B, as a second stage, a pallet engagement mechanism 190 provided at the workstation 60 (in this case, a movable cam, sometimes referred to as the workstation portion of the pallet engagement mechanism) is advanced forward to lower the mounting plate 175 and pins 180 from the moving element 50 such that the moving element 50 is disengaged from the pallet 30. The moving element 50 is then free to move along the track section 35 while the pallet 30 remains locked at the workstation 60.

Figure 7A:
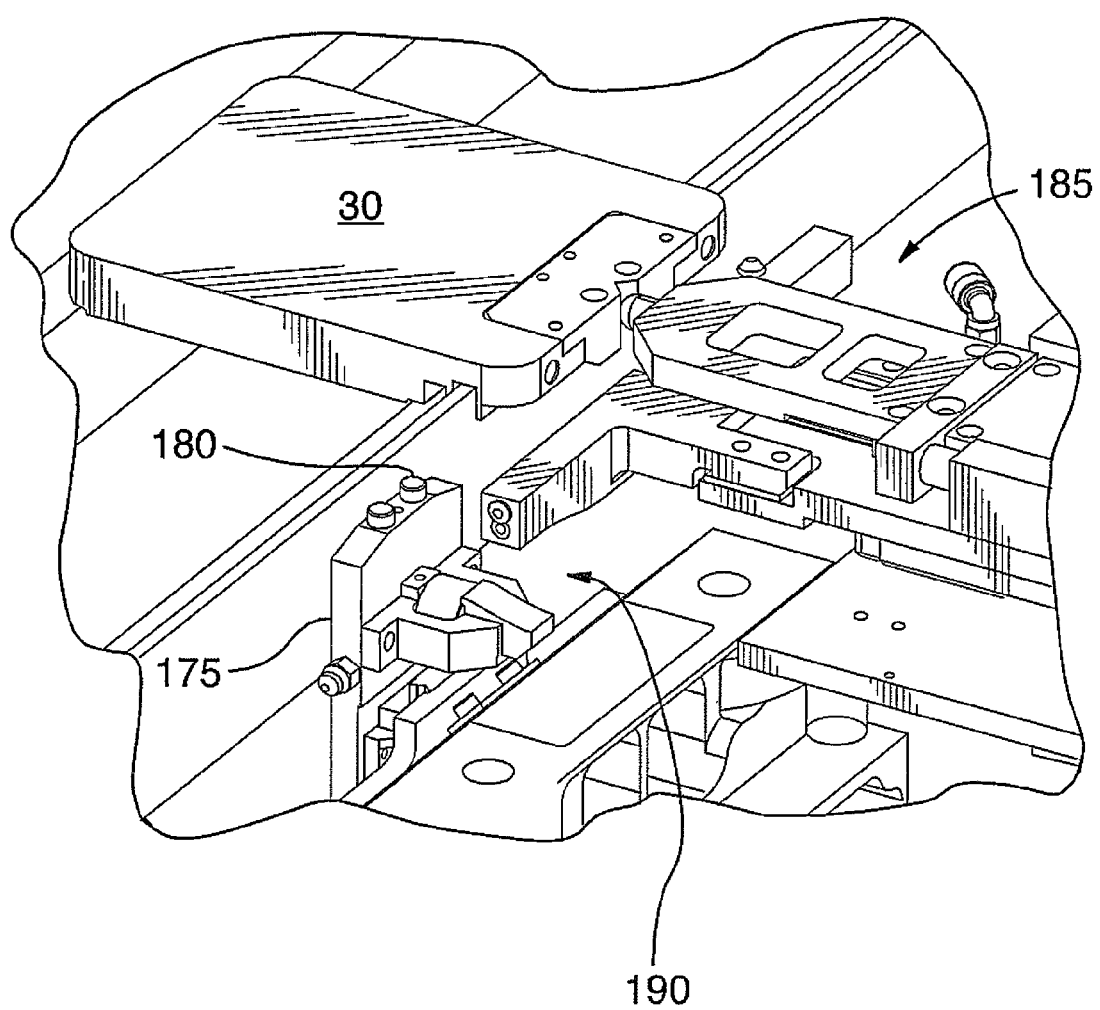
FIGS. 7A-7C are detailed perspective views showing engagement of the moving element with the pallet.
Figure 7B:
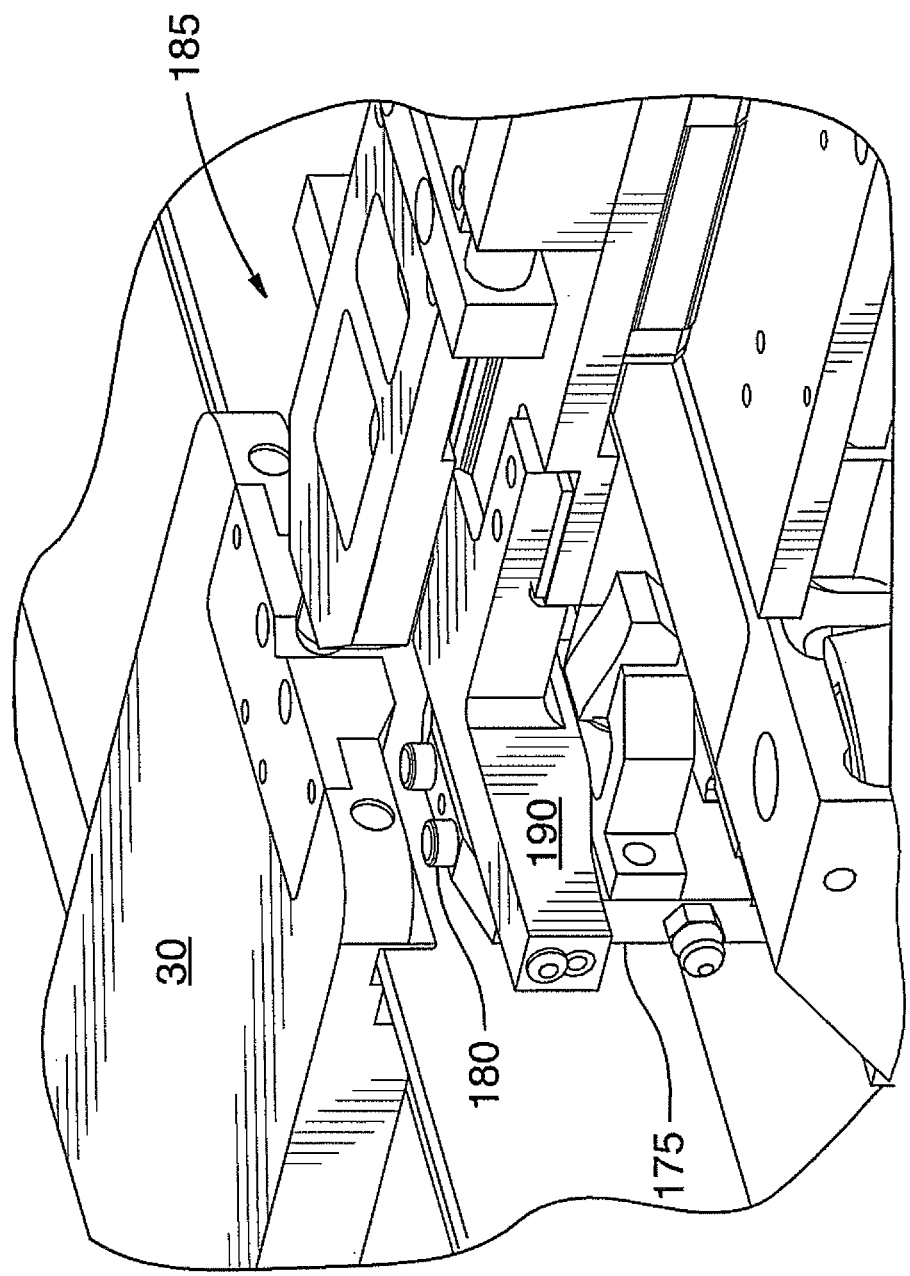
Figure 7C:
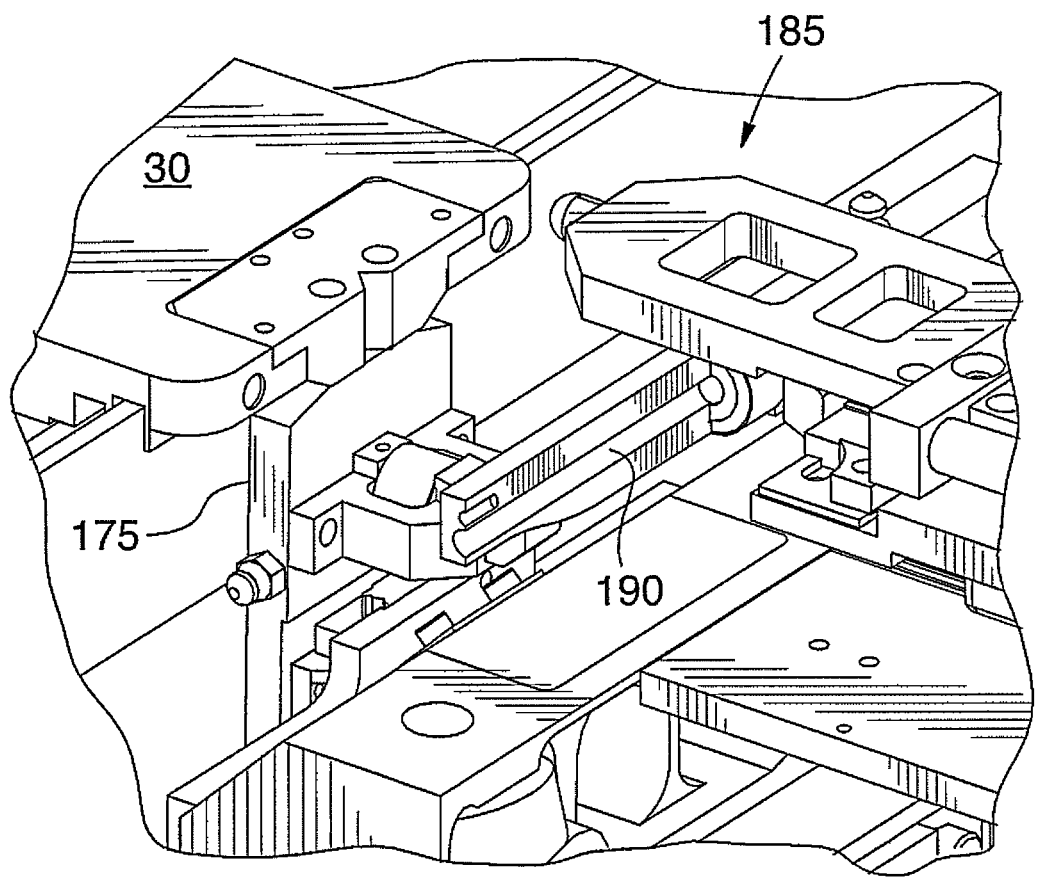

FIGS. 7A to 7C illustrate engagement of the moving element 50 with the pallet 30. FIG. 7A shows the moving element 50 approaching the workstation 60 where the pallet 30 is locked by the workstation locking mechanism 185. The pallet engagement mechanism 190 also remains advanced towards the pallet 30 in the position from FIG. 6B described above. FIG. 7B shows the moving element 50 engaging with the pallet engagement mechanism 190 at the workstation 60 such that the mounting plate 175 and pins 180 on the moving element 50 are lowered prior to engagement with the part pallet 30. In FIG. 7C, as a first stage, the pallet engagement mechanism 190 has been retracted to allow the mounting plate 175 and pins 180 to rise and engage with the part pallet 30. Following the engagement, as a second stage, the workstation locking mechanism 185 is retracted to allow the pallet 30 to move with the moving element 50.

The use of a two stage mechanism ensures that the part pallet is engaged with the moving element 50 before release from the workstation 60 or locked at the workstation 60 before disengagement from the moving element 50. This approach is intended to ensure that the pallet 30 is always accurately positioned either at a workstation 60 or in relation to a moving element 50.

Figure 8A:
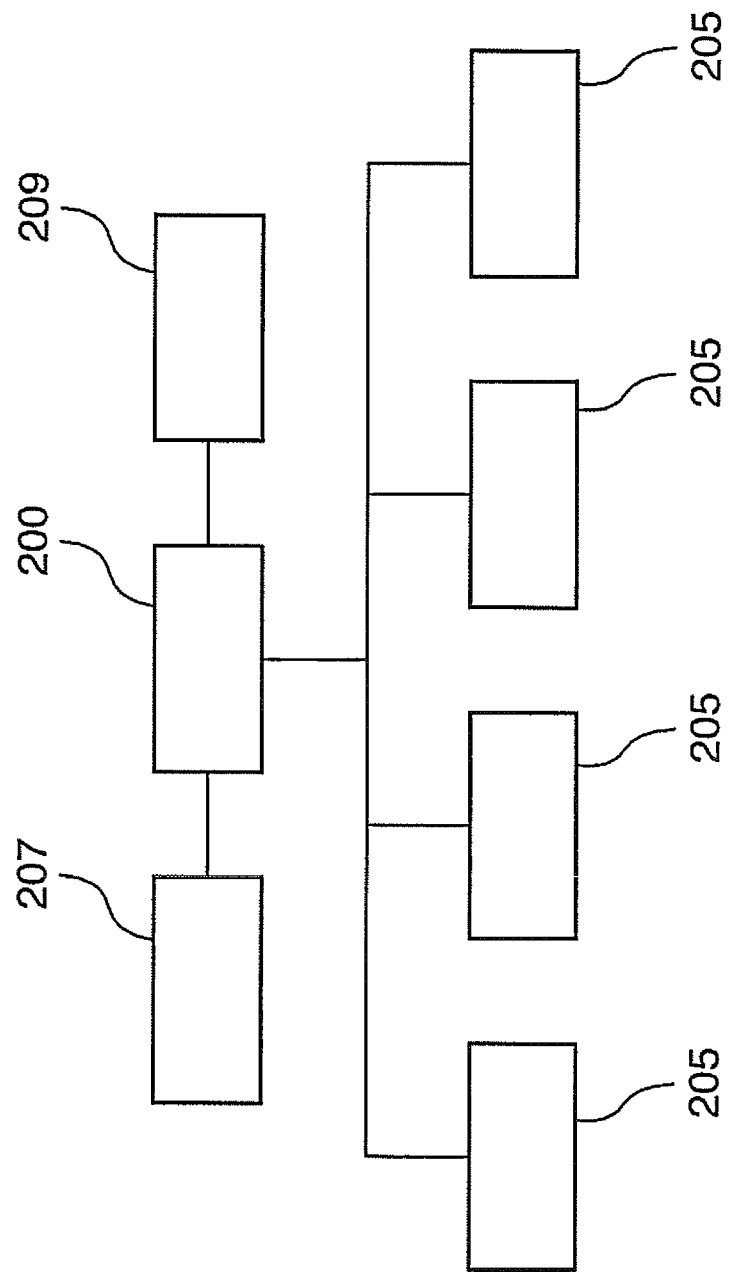
FIGS. 8A and 8B are block diagrams of an example distributed control architecture for controlling the track section of FIG. 2.

FIG. 8A is a block diagram of an example control architecture employed in the conveyor system 20. As shown in FIG. 8A, the conveyor system 20 includes a central controller 200 that controls the overall conveyor system 20 and a section controller 205 for each of the track sections 35 used in the conveyor system 20 (four section controllers 205 are shown). As described above, the conveyor system 20 can be formed from a plurality of modular track sections 35, representing control zones, which are controlled by a section controller 205. The central controller 200 may monitor destination data for the moving elements 50 (which are preferably uniquely addressed) and receive acknowledgement messages in return when moving elements 50 have reached their destinations. As such, the central controller 200 may be used for process (i.e. manufacturing-line) control. The central controller 200 may also provide a supervisory diagnostic role by monitoring the section controllers 205 (e.g., by engaging in a continuous polling process) in order to determine whether any section controller 205 has failed. It will also be understood that the central controller 200 may also provide control for the infeed conveyor 25 and outfeed conveyor 70, for example via infeed controller 207 and outfeed controller 209.

Figure 8B:
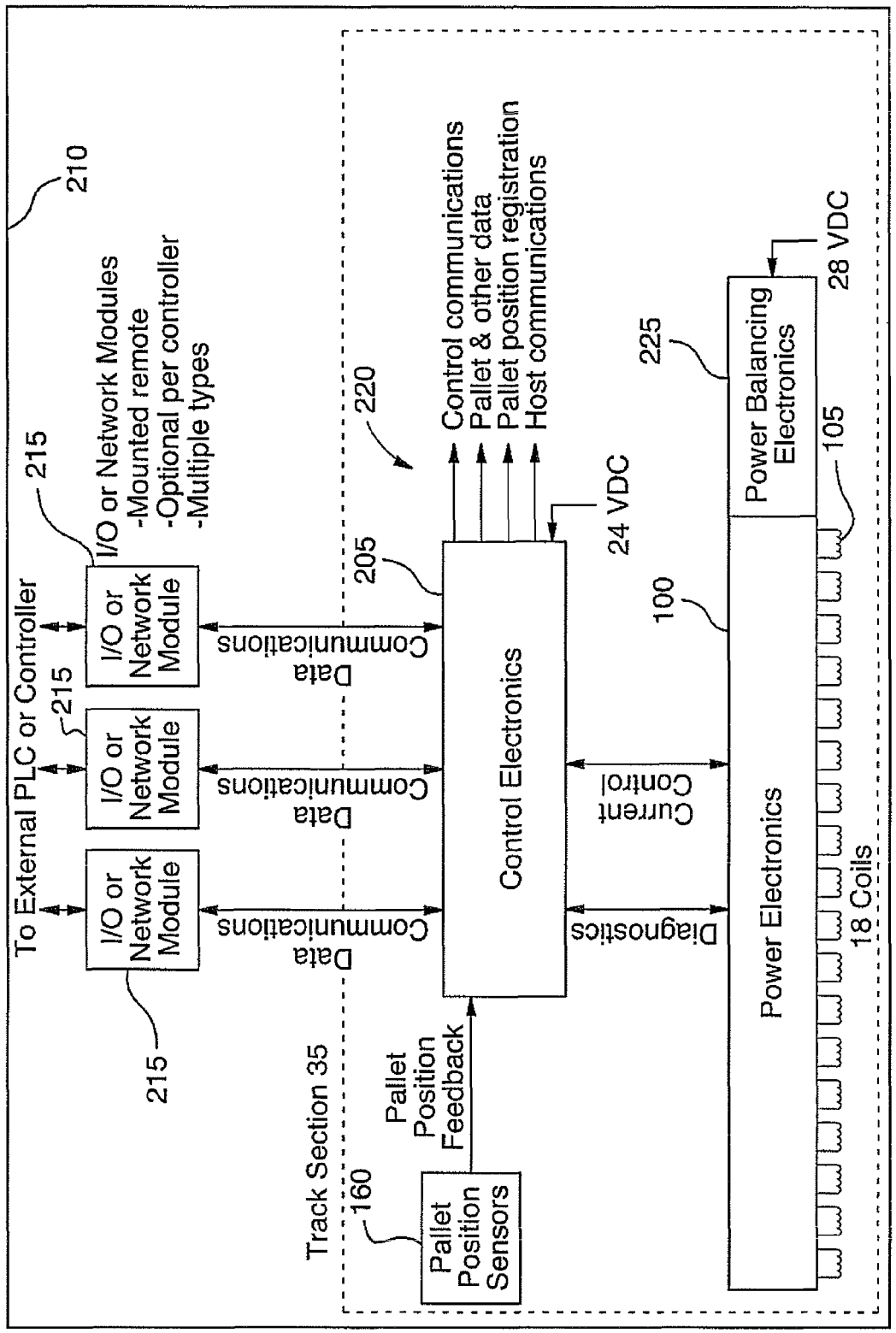

FIG. 8B is a block diagram of an example control system 210 for a track section 35. The control system 210 includes the section controller 205 that is connected to the central controller 200 via an input/output (I/O) or network module 215. In this embodiment, the section controllers 205 are connected to one another in a peer-to-peer communications network such that each section controller 205 is connected to preceding and following section controllers 205 through a communications links 220. It will be understood that other alternative embodiments may include use of the central controller 200 to convey information/data between section controllers 205 or the like.

The section controller 205 may also be connected to other devices, such as programmable logic controllers (PLCs) (not shown) via input/output (I/O) or network modules 215. The PLCs may provide manufacturing-line station-processing instructions to the track section 35, such as directing the next destination for a moving element 50 along the track 75, or providing station-specific motion instructions in respect of a given moving element 50 stopped adjacent to a workstation 60. For instance, a typical two-axis station controller or PLC may operate by providing pulse signals in order to synchronize the motion of a moving element 50 along the track 75 with the motion of a station end effector (not shown) or the like moving along a transverse axis, whereby each pulse represents an incremental move command for the moving element 50. It will be appreciated that the provision of the direct connection to the PLC reduces the amount of bandwidth that would otherwise be required to communicate this information through the central controller 200, thereby substantially eliminating a potential limitation on the length and processing capabilities of the track section 35.

As illustrated, each section controller 205 is connected to the stator armature 100 and coils 105 in the corresponding track section 35 and controls the coils 105 in accordance with an independent trajectory or "move" command for each moving element 50 located therein.

Each track section 35 also includes power balancing electronics 225 that may include, for example, current amplifiers, current sensing circuitry, temperature sensor, voltage sensors and the like. The section controller 205 may periodically poll the power balancing electronics 225 in order to obtain diagnostics data provided by these sensors.

Each section controller 205 is also connected to the encoder read heads 160 situated in the track section 35. The section controller 205 is used to implement a closed-loop digital servo control system that controls movement of the moving element 50 by resolving the absolute position of each moving element 50 located in its track section 35. The section controller 205 makes use of a moving element position feedback subsystem, which supplies measured moving element position data to the section controller 205. Referring to FIGS. 4A, 4B and 5, when the encoder strip 155 of a given moving element 50 moves over a given encoder read head 160, signals are produced and cause the section controller 205 to update the position of the moving element 50 in accordance with the direction of travel of the encoder strip 155. The section controller 205 provides processing for sampling the encoders 160 and resolving the position of each moving element 50 located in the associated track section 35. Broadly speaking, the processing associates the encoder strip 155 of any given moving element 50 with only one encoder 160 at any time so that the absolute position of the given moving element 50 can be calculated based on a fixed position of the associated encoder (or more specifically its read head 160) and a relative position of the encoder strip 155 in relation to the associated encoder 160. In addition, when the encoder strip 155 simultaneously engages two encoders 160, the processing transfers or handsoff the association or "ownership" of the moving element 50 from the current encoder 160 to an adjacent engaged encoder 160. In this manner, the position of a given moving element 50 can be continuously tracked across the control zone. When a moving element 50 crosses control zones, a similar process occurs, with the addition that the adjacent section controller 205 creates a data structure to keep track of the position of the given moving element 50, and, once the hand-off is completed, the data structure for the moving element 50 in the (now) previous control zone is deleted.

As one example, if a 400 lines-per-inch graded encoder strip 155 moves one inch through a given encoder read head 160, such movement will cause an associated counter to change by +/−400, depending on the direction of travel. This type of encoder read head 160 as well as the associated encoder strip 155 are commercially available, for instance, from US Digital of Washington, U.S.A. The encoder strip 155 may further include an incremental encoder portion (not shown) having a plurality of index points staggered along the strip such that the moving element 50 can be located based on reading as few as two index points.

Those skilled in the art will appreciate that the encoder system 157 may be optical or may be another alternative system. For example, a passive readable device can be a magnetic strip and the encoder read heads can be corresponding magnetic detectors. Such an alternative embodiment may provide very fine resolution.

Figure 9E:
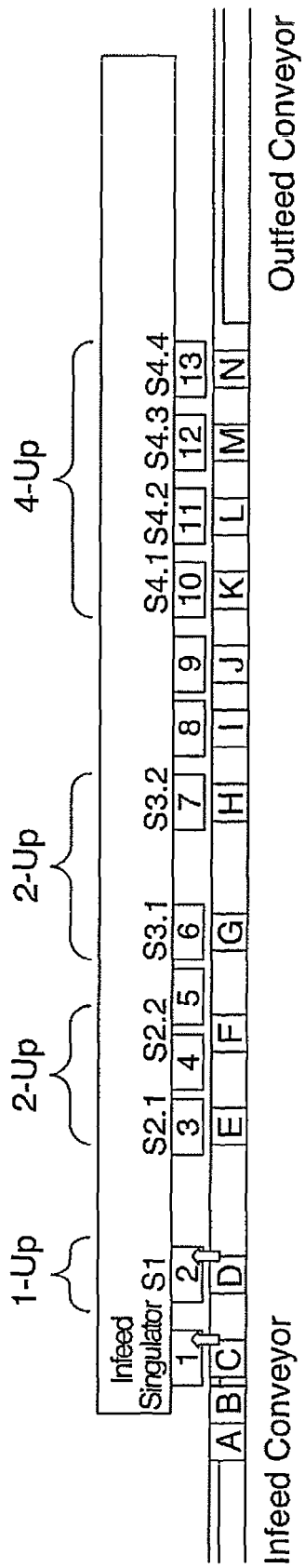

FIGS. 9A-9I illustrate operation of the conveyor system 20 in a multi cycle time, multi pitch arrangement. As shown in FIG. 9A, pallet F is at a first workstation S1 and pallet E is at the infeed singulator awaiting processing. At this stage, moving element 1 engages with pallet E and moving element 2 engages with pallet F. In FIG. 9B, moving element 2 has advanced pallet F to an intermediate position between the first workstation and a second workstation S2. At the same time, moving element 1 moves pallet E to the first workstation S1.

In FIG. 9C, moving elements 1 and 2 move back up the track such that moving element 1 is aligned with and engages pallet D at the infeed simulator and moving element 2 is aligned with and engages pallet E at the first workstation S1. At the same time moving elements 3, 4, 5, 6 and 7 align with and engage pallets F, G, H, I, J. In FIG. 9D, moving elements 1 through 7 have advanced together with associated pallets and release pallet D at the first workstation S1, pallets E and F at the second workstation S2, pallets G and H at the third workstation S3 and pallets I and J at an intermediate position between the third workstation S3 and the fourth workstation S4. As is apparent in FIG. 9D, the pallets can be positioned independently at workstations 60 having variable pitches and operating on multiple pallets at the same time.

Figure 9F:
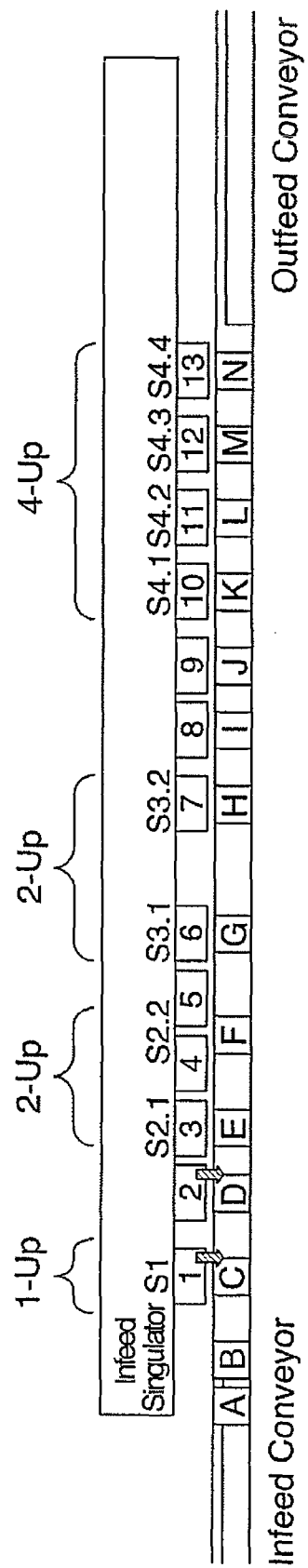

In FIG. 9E, moving elements 1 and 2 return to the beginning of the track such that moving element 1 is in a position adjacent to and engages with pallet C at the infeed singulator and moving element 2 is positioned adjacent to and engages with pallet D at the first workstation S1. As shown in FIG. 9F, moving elements 1 and 2 then advance pallets C and D such that pallet C is positioned at the first workstation S1 and pallet D is positioned at an intermediate position between the first workstation S1 and the second workstation S2. This movement prepares pallet D for advancement into workstation S2 which operates as a "2 up" workstation.

Figure 9G:
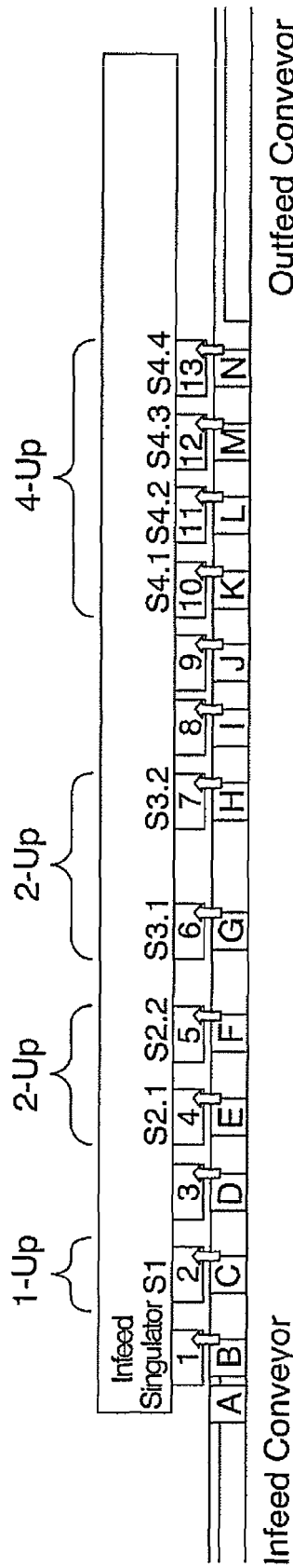
Figure 9H:
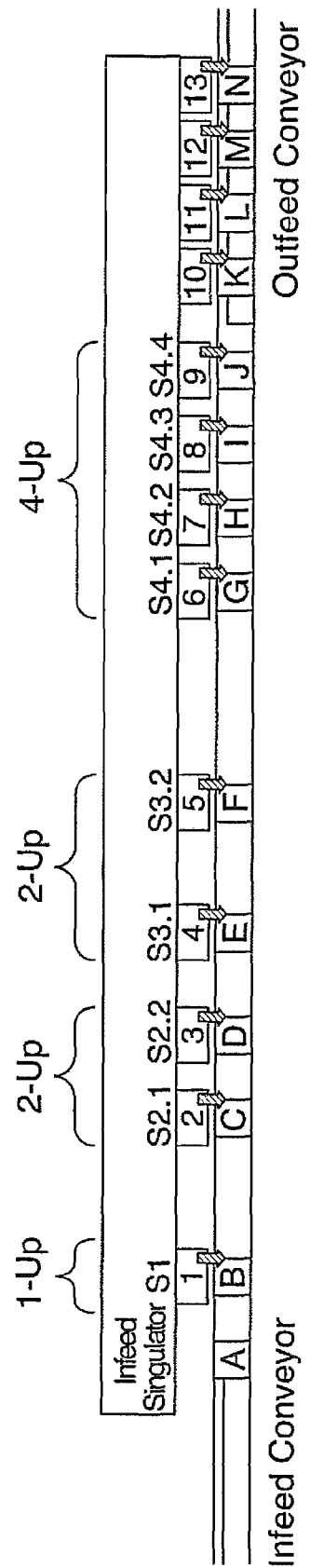

As shown in FIG. 9G, moving elements 1 to 13 are positioned adjacent to and engage with pallets B to N. In FIG. 9H, moving elements 1 to 13 advance, moving pallets B through N forward along the track. Pallet B is positioned at the first workstation S1, pallets C and D are moved into the second workstation S2, pallets E and F are moved into the third workstation S3, pallets G, H, I, J are moved into the fourth workstation S4, and lastly, pallets K, L, M, N are moved onto the outfeed conveyor where they can be sent for additional processing.

Figure 9I:
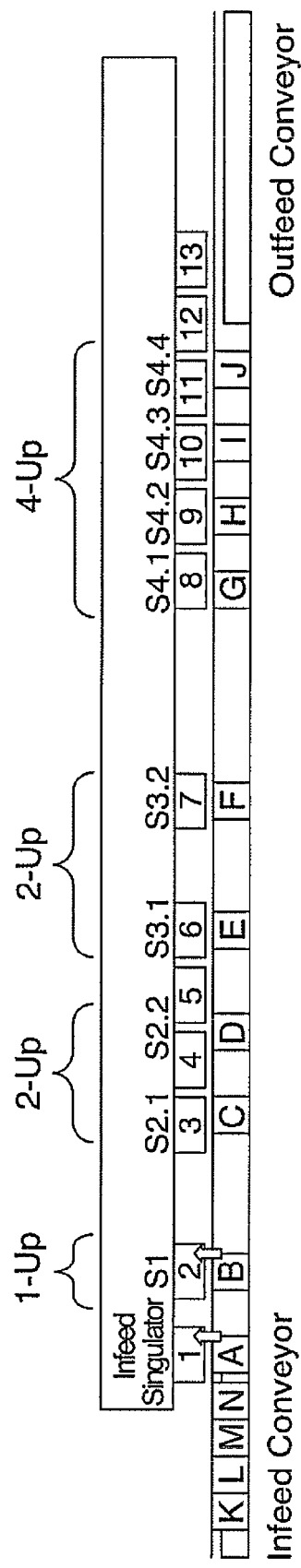

In FIG. 9I, the moving elements 1 and 2 return to the beginning of the track where moving element 1 is adjacent to and engages with pallet A and moving element 2 is adjacent to and engages with pallet B at workstation S1. At this point, the process continues repetitively.

It will be understood that FIGS. 9A-9I illustrate just one possible arrangement of workstations, pallets, and moving elements to illustrate the ability of the conveyor system 20 to advance pallets through a process that has multiple pitches, multiple cycle times and workstations that operate on more than one pallet at a given time, based on the cycle times involved.

When dealing with magnetic linear drive systems such as that described above, one issue can be the addition or removal of the moving elements 50. In order to overcome this concern, a modular track section may be provided with an extension, for example, approximately 300-600 mm (12-24 inches) long, that is not provided with an encoder or motor section. For removal or addition, the moving element 50 can be manually moved to this extension section and removed or placed on this extension section and pushed back onto a powered track section.

In the modular conveyor system, part tracking data can be tracked by providing a sensor or reader (not shown) to obtain part information at the infeed station. The part data can then be associated with individual moving elements 50 or workstations 60 as the pallet 30 moves through the track section. As such, part data and position can be tracked accurately throughout the track sections 35.

In the situation where there is a failure of the system of some kind and it is necessary to reset the system in order to identify individual moving elements 50 and locations, a process can be used to reorient the moving elements 50 of the system. In a particular embodiment, all moving elements 50 can be manually moved to a downstream position. On startup the system can move all moving elements 50 upstream to a pre-programmed target position at which point moving element IDs can be assigned sequentially from a programming logic controller. After the ID is assigned, the moving elements 50 can be released by the PLC to go to a dedicated pick position target. In some cases downstream moving elements 50 may be released to upstream holding targets until the most downstream moving element 50 has been sent to its pick position target. It will be understood that the number of holding targets will depend on the physical layout. This type of recovery sequence can be coordinated by the PLC and has the benefit that no RFID or IR or other moving element ID system is generally required.

Each track section 35 or each combination of track sections 35 can be provided with both mechanical and software limits in order to prevent moving elements 50 from running off at the end of the track section 35 or combination of track sections 35.

As the modular conveyor system 20 includes both powered track sections and mechanical infeed and outfeed conveyors, operator stations can be provided outside of a guarded area that may be provided for the higher power track sections 35 which provide the independent control. This provides for greater safety for operators. The use of mechanical infeed and outfeed conveyors allows for more buffering flexibility in between areas on the manufacturing line. For example, a conventional conveyor may be placed in between two linear-drive areas to allow for cheaper buffering if one linear-drive area is stopped for any reason. The appropriate use of buffering can improve overall equipment effectiveness (OEE).

This combination modular conveyor system 20 has advantages over conventional systems in that the pallet size is not limited by the chassis pitch and multiple parts can be provided on one pallet. On the track sections 35, each moving element 50 can be moved independently to allow for offsetting at one workstation 60 while performing a multi operation at another workstation 60, and full access to the part from all sides is provided within the track sections 35. Further, because of the accurate indexing on the track sections 35, the moving element 50 may provide x-axis movement to provide for coordinated motion with y and z axes devices at the workstation 60.

Embodiments of the modular conveyor system 20 disclosed herein are generally intended to provide a number of advantages over conventional conveyor systems. For example, the use of relatively inexpensive conventional conveyors for part transport reduces costs while the independently controlled moving elements 50 of the track section 35 can be used for precise control of position. Further, the electromagnetic structure of the track sections 35 provides smooth thrust and high speed while maintaining accurate positioning. Furthermore, the distributed control system enables each moving element 50 to be individually and separately controlled yet interface easily with manufacturing process controllers for infeed and outfeed conveyors. Finally, the conveyor system 20 can be constructed out of discrete, self-contained, modular track sections 35 and infeed and outfeed conveyors, with little practical restriction on the length of the conveyor system or the number of moving elements 50 controlled thereby.

Figure 10A:
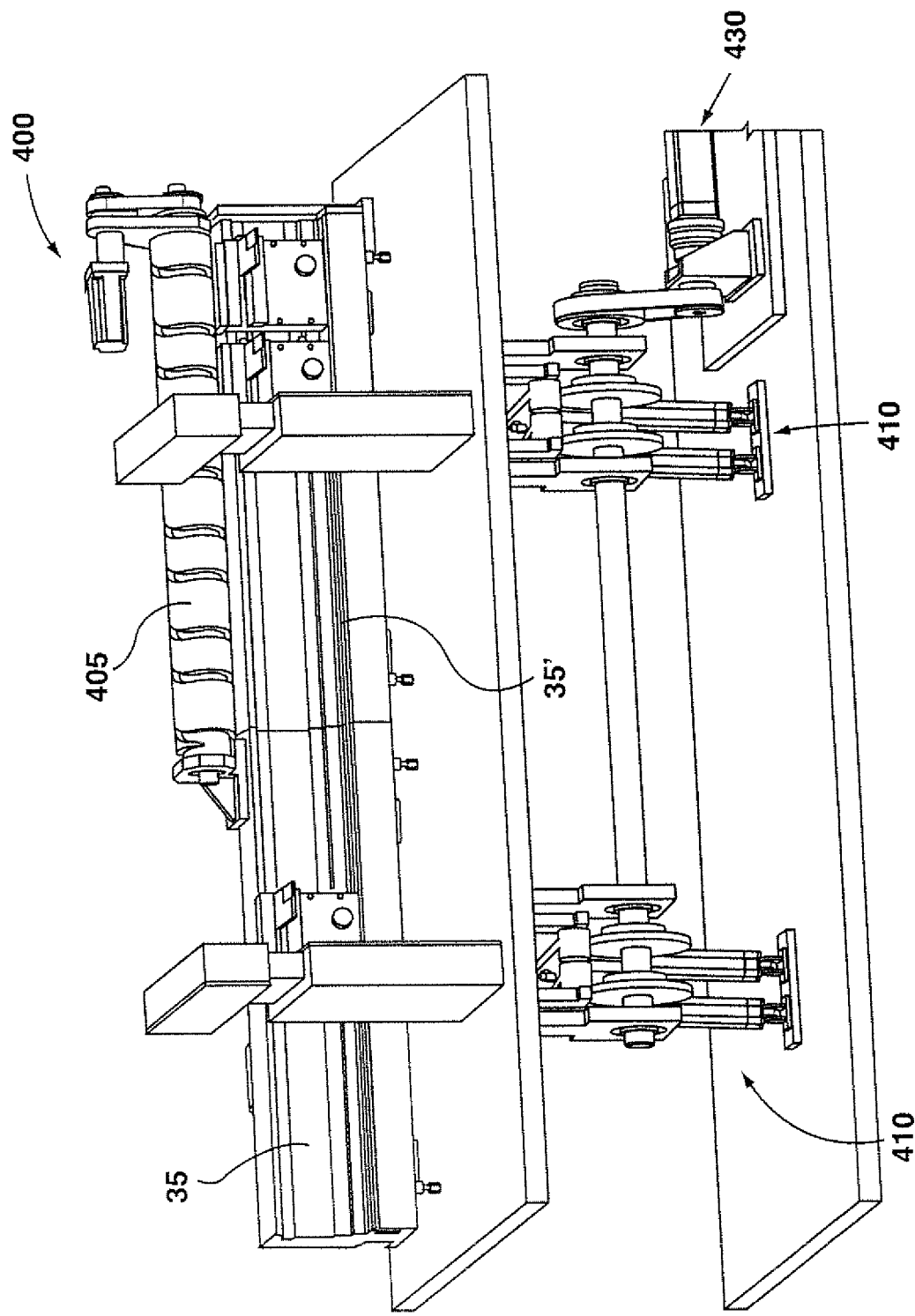
FIG. 10A illustrates another embodiment of a modular conveyor system in which a powered track section is used with an unpowered track section including a scroll cam drive system.
Figure 10B:
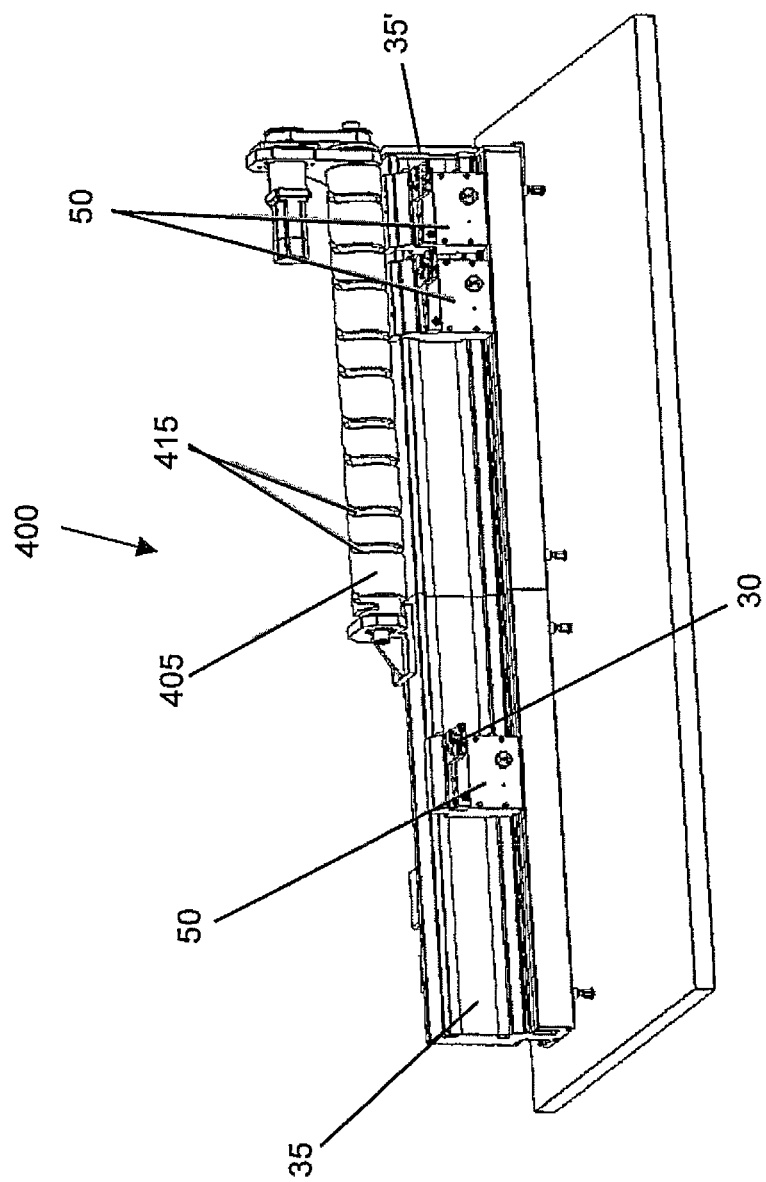
FIG. 10B shows the embodiment of FIG. 10A but without pick and place elements.

FIG. 10A shows a further embodiment of the use of modular track sections 35 together with a mechanical conveyor 400. In this case, rather than a conventional belt conveyor, the mechanical conveyor 400 comprises a scroll cam 405 provided to a modular track section 35' that has had the linear drive removed (or alternatively, turned off), referred to as an unpowered track section 35'. As shown in FIG. 10A, pick and place elements 410 may be provided with the powered track section 35 or unpowered track section 35'. FIG. 10B shows a view of this embodiment with pick and place elements removed. In this embodiment, the moving elements 50 are configured to move off of the powered track section 35 and along the unpowered track section 35'. As with the embodiments above, the moving elements 50 may be provided with a pallet 30 that is engaged with the moving element 50 such that the pallet 30 moves with the moving element 50 as the moving element 50 moves along both powered and unpowered track sections 35 and 35'.

Figure 10C:
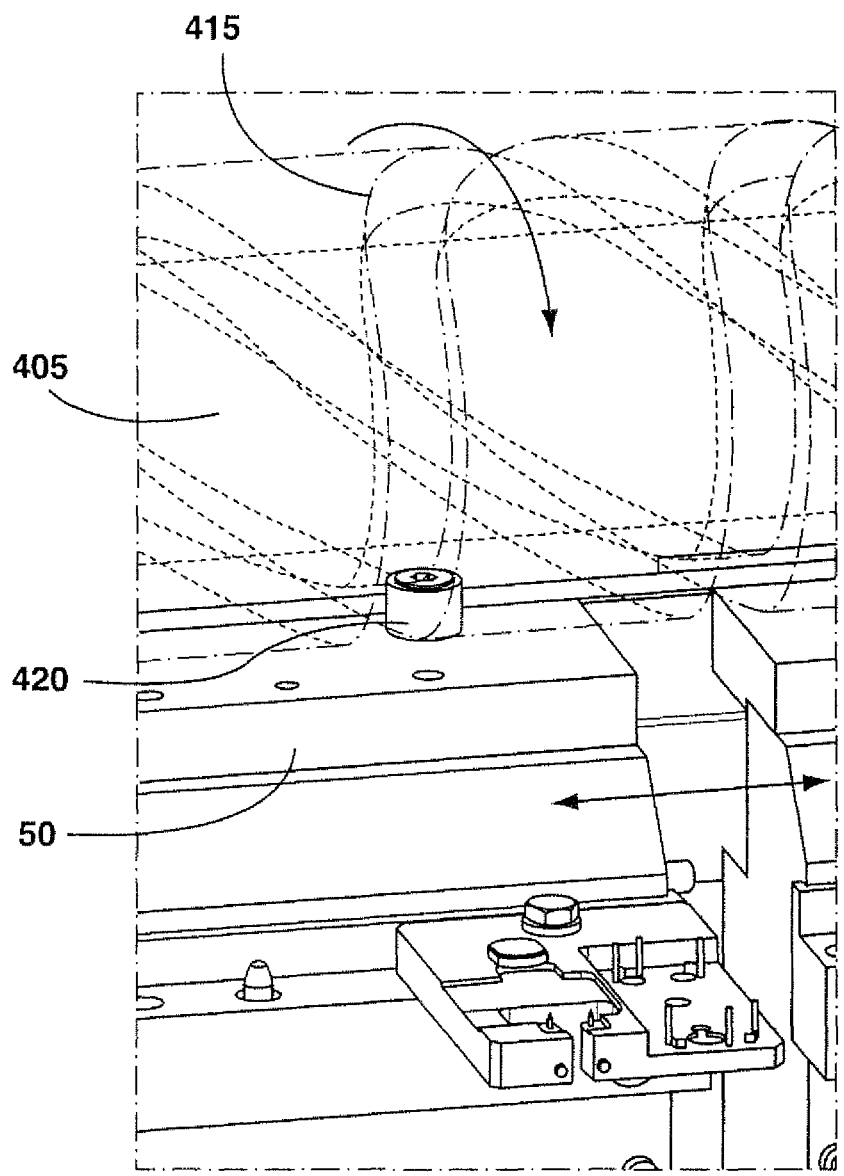
FIG. 10C illustrates the use of the rotating scroll cam to guide the moving elements on a linear track via roller pins in a cam groove in the scroll cam.
Figure 10D:
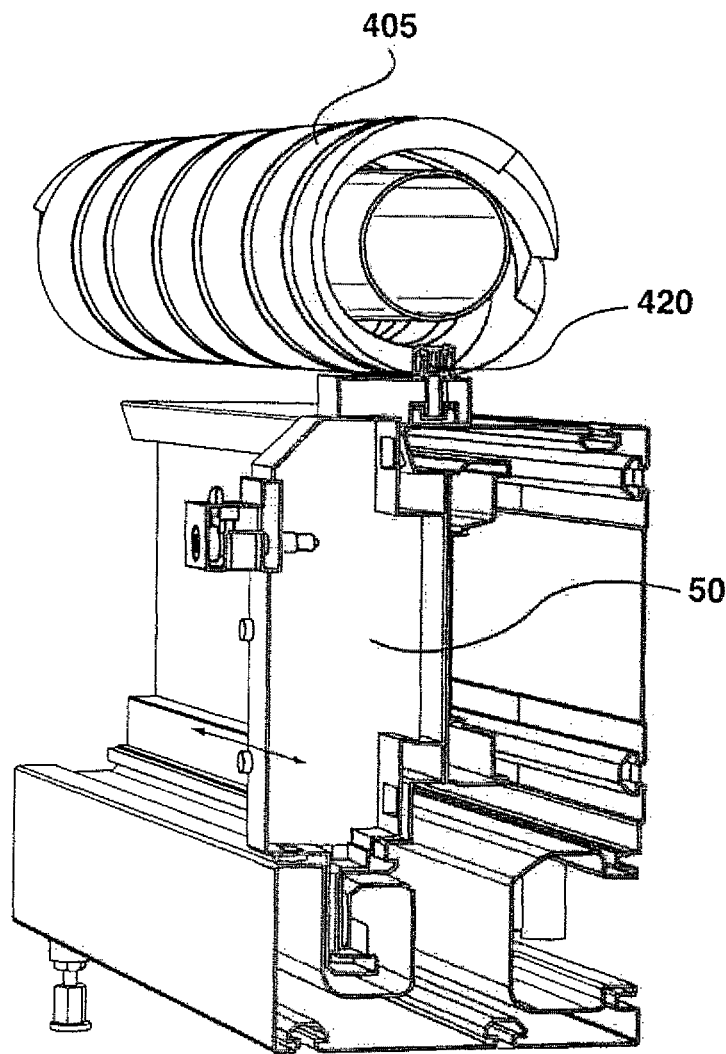
FIG. 10D illustrates the engagement of the roller pin in the cam groove.
Figure 10E:
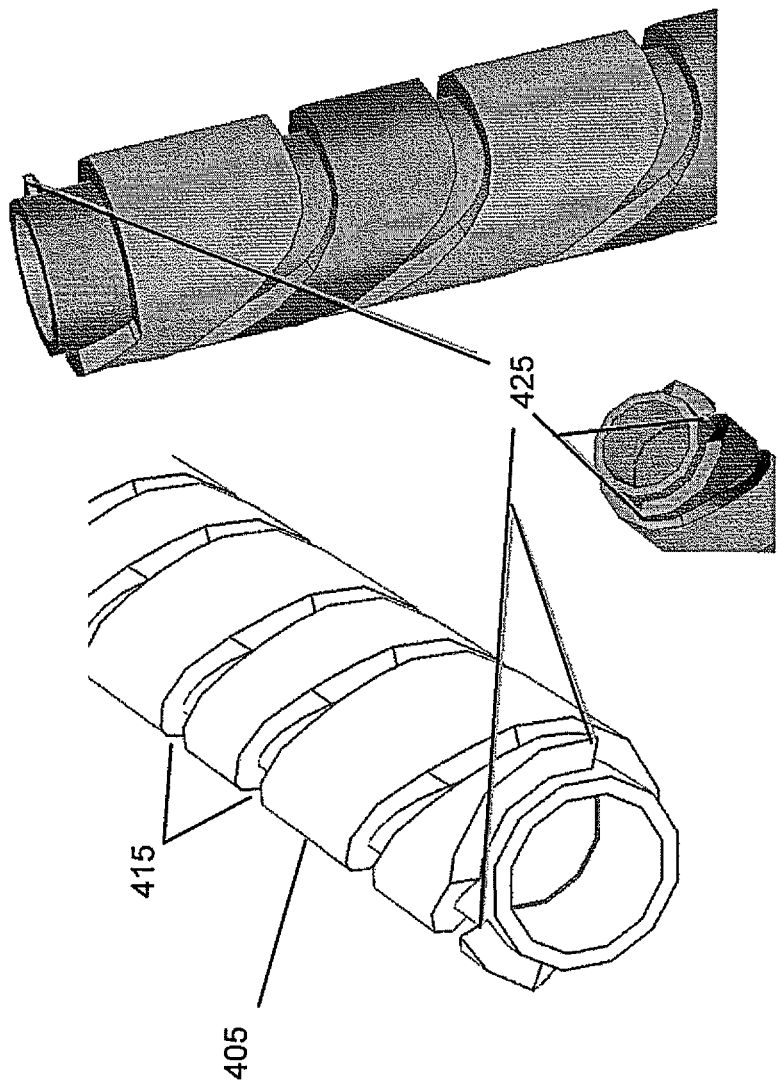
FIG. 10E shows the groove start opening for the cam grooves on the scroll cam.

As a moving element 50 passes from a powered track section 35 to an unpowered track section 35', the driving of the moving element 50 is passed from the linear drive 75 to the scroll cam 405. FIGS. 10C and 10D show the scroll cam 405 and moving element 50 in additional detail. The scroll cam 405 includes a cam groove 415 (or multiple grooves—two grooves 415 in this embodiment) that engages with one or more cam followers 420 (in this case, a roller pin) on the moving element 50 and advances the moving element 50 along the unpowered track section 35'. FIGS. 10C and 10D illustrate how a pitch of the groove 415 interacts with the cam follower 420 to transfer circular motion into linear motion. The scroll cam 405 can be rotated forward or backwards and the sense of rotation determines the direction of motion of the moving element 50 through the engaged roller pin 420 in the cam groove 415. The cam groove 415 can be configured for various types of movement of the moving element 50 along the unpowered track section 35', including short stationary periods, pitched movement, continuous movement, or the like. FIG. 10E illustrates a configuration of a groove 415 that includes a groove start arrangement 425 to allow the groove 415 to collect the cam follower 420.

It will be understood that the scroll cam enabled unpowered track sections 35' will also be configured as modular sections that can be joined, either with powered track sections 35 (linear drives) or with other unpowered track sections 35' wherein two scroll drives 405 may be connected to each other to provide a longer scroll drive 405 and unpowered track section 35' of an assembly line.

Elements from the powered track section 35 embodiments described above, such as the encoder system 157, may remain in place where effective. In the case of the encoder system 157, the encoder system 157 may remain on the unpowered track section 35' and the moving element 50 in order to allow accurate tracking of the moving element 50 as it moves along the unpowered track section 35'. The use of a standard modular track section that may have a linear drive or a mechanical drive, such as the scroll cam 405 is intended to allow for the creation of flexible automation systems.

It will be understood that alternative embodiments may allow the pallet 30 to be separated from the moving element 50 (as in the in feed conveyor 25 and out feed conveyor 70 of the initial embodiments above) and the pallet 30 may be advanced in the unpowered track section by being engaged with the moving element 50 (in interaction with the scroll cam 405) or by the scroll cam 405 directly, for example, by providing cam followers (not shown) to the pallet 30 and disengaging the pallet 30 from the moving element, similar to the engagement and disengagement of the moving element 50.

An intended advantage of the present embodiment is being able to run non-synchronous (powered track section) to synchronous (unpowered track section) without a change over to a different track system. It is possible to run smoothly from non-synchronous to synchronous (sometimes called "continuous motion") and back to non-synchronous or alternatively, to start with synchronous and then to non-synchronous, all in a single modular track environment. It will be understood that the modularity of the track sections 35 and 35' make it possible to have any required number of drive system changeovers succeeding one another in order to create an assembly line or the like.

In some embodiments, pick and place motion can be handled by a separate pick and place drive system 430 (as shown in FIG. 10A), in which case a PLC (programmable logic controller) (not shown) can be used to coordinate pick and place and moving element motion control. In other embodiments, pick and place motion may be directly coupled with moving element motion (further description below), in which case, both the scroll cam 405 (providing pallet motion) and the pick and place 410 may be driven by a common drive. In this case, it will generally be more important to have the scroll cam 405 undergoing continuous movement. In this situation, it is still possible to temporarily halt the movement of a moving element 50 (or pallet 30) by providing cam grooves 415 that follow the rotational movement of the scroll cam 405 around its circumference. This configuration can create a brief "dead zone" where the moving element 50/pallet 30 will not move even though the scroll cam 405 is turning. It will be understood that any temporary halts or dead zones will be limited by the circumference of the scroll cam and the rate of rotation.

In the embodiment illustrated in FIGS. 10A to 10E, the ability to drive pallet movement by linear drive followed by scroll cam is intended to include benefits such as:

a. the use of lower cost scroll cam based motion control where suitable with flexibility of using linear drive control where required for processing requirements;

b. the ability to de-couple large cam based systems into multiple zones (modularity) providing improved integration flexibility, maintenance/serviceability, and providing flexible buffering between cam zones using linear servo control; and c. the ability to perform liquid filling and other wet operations in the cam based zone thereby protecting the linear drive sections from potential liquid damage.

Figure 11A:
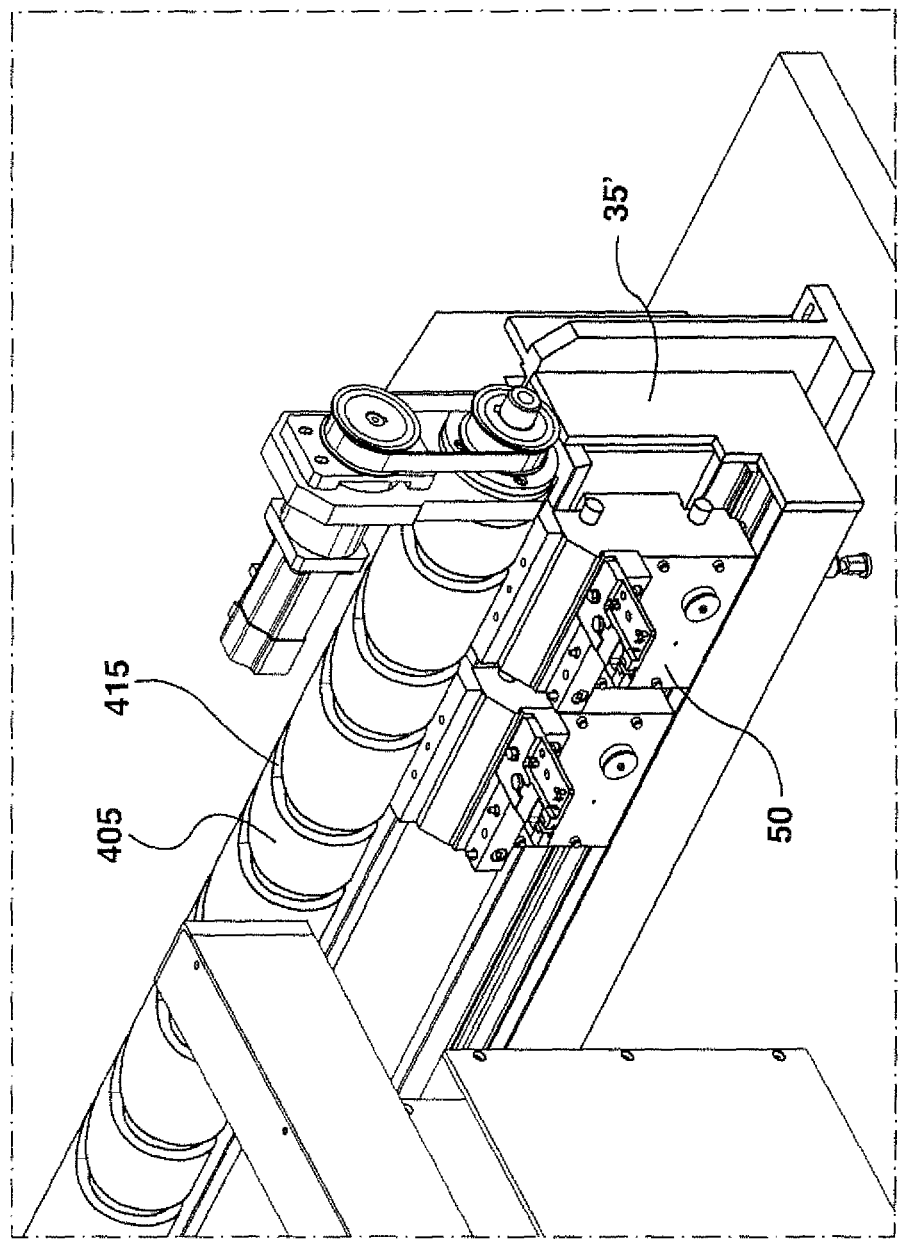
FIGS. 11A-11C illustrate the scroll cam and the engagement with the moving elements.
Figure 11B:
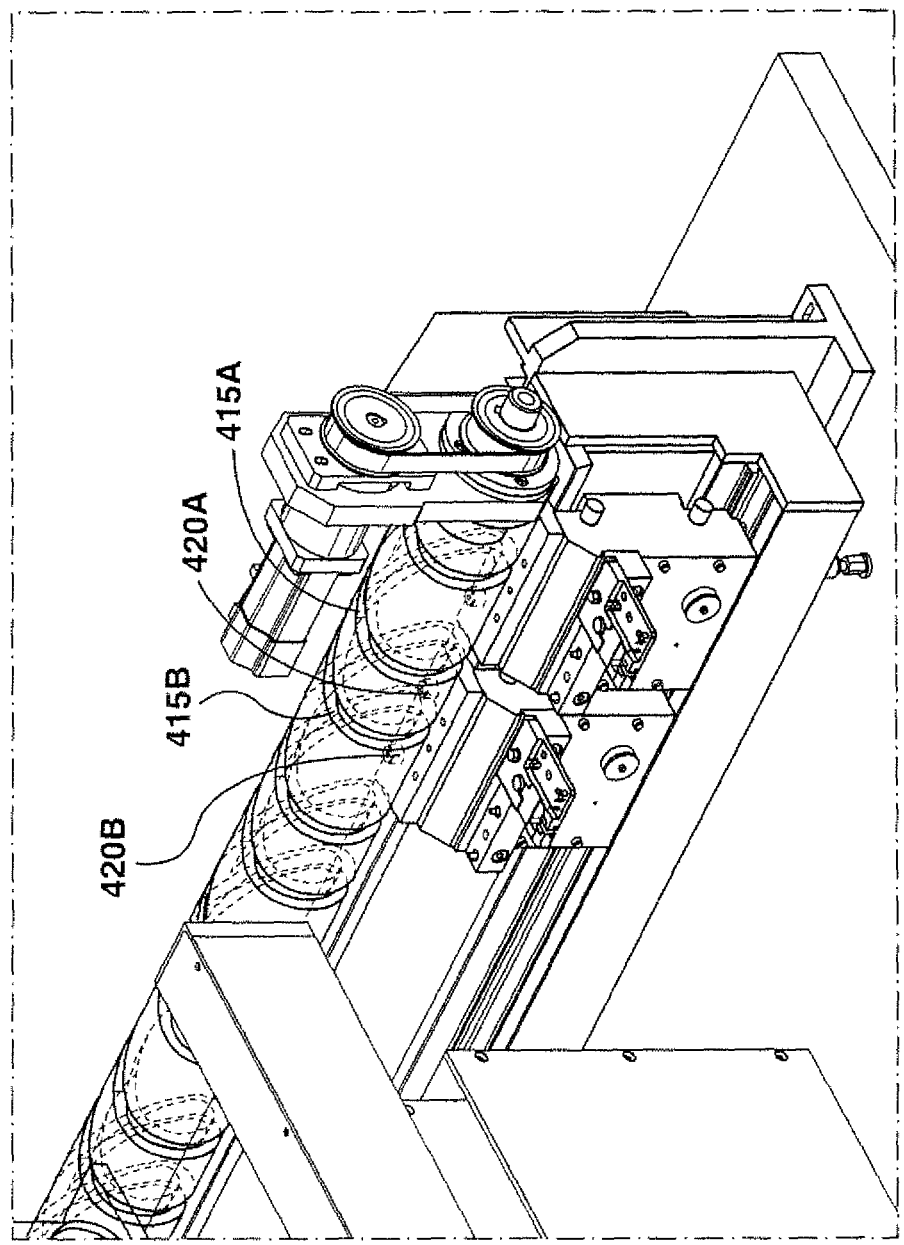
Figure 11C:
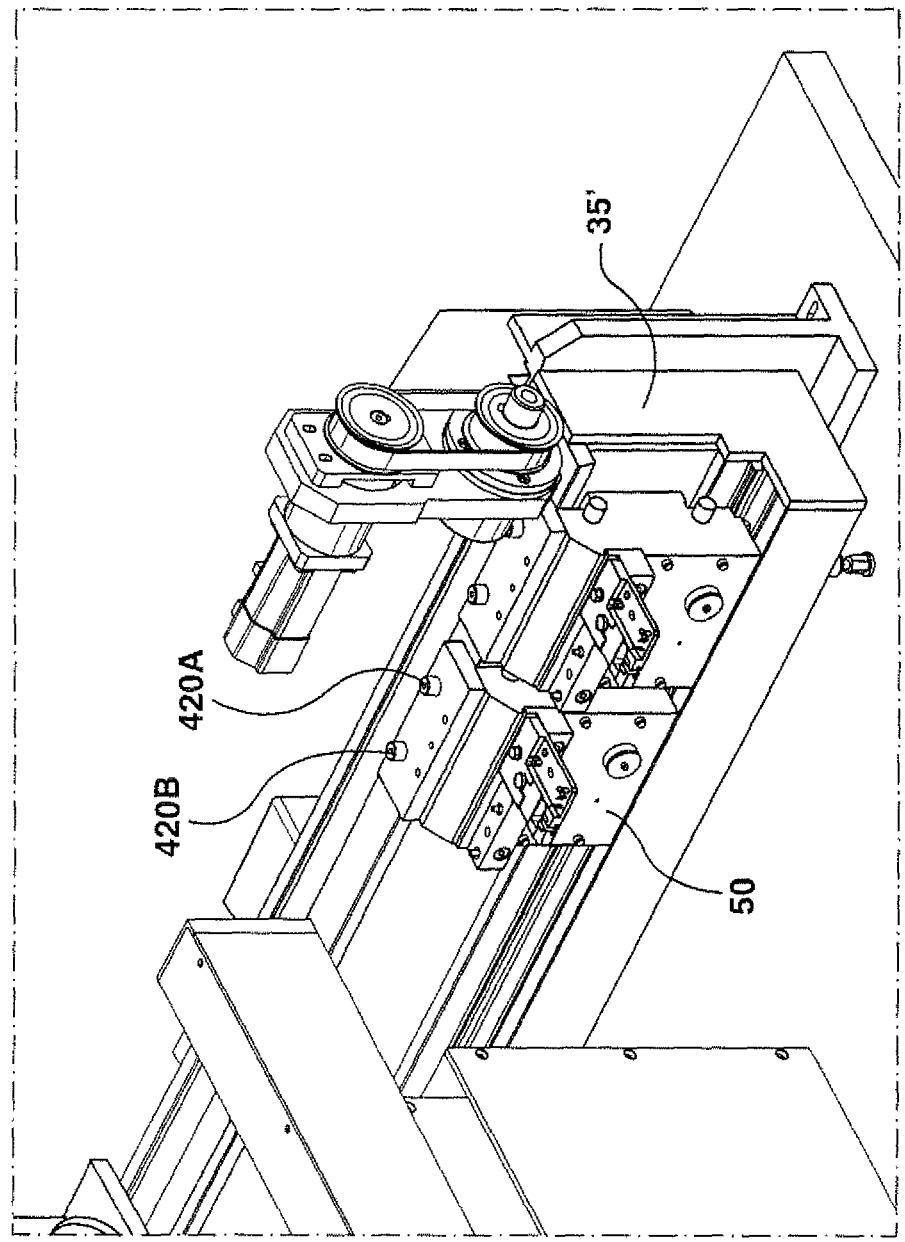

In some cases, the scroll cam 405 may preferably use two cam grooves/guides 415 matched to two roller pins (cam followers 420) provided on the moving elements 50 to provide the guided motion (as shown in FIGS. 10A-10E). FIGS. 10C-10E shows a sample scroll cam with 2 parallel grooves (sometimes called "twin grooves"). The circular (angular) positions of the groove-starts 425 on the scroll cam 405 are configured to engage the roller pins 420 of an arriving moving element 50 as can be seen in FIG. 10E. FIGS. 11A to 11C illustrate moving elements 50 on the unpowered track section 35'. As the moving element 50 arrives at the unpowered section 35', the scroll cam 405 commences rotating and the groove-start 425 (see FIG. 10E) engages a first roller pin 420A (see FIG. 11C) positioned near the front of the moving element 50, bringing the first roller pin 420A into a first groove 415A. The distance between the two grooves 415A and B on the scroll cam 405 leads to respective angular offset of the groove-start 425 related to the first groove 415A and second groove 415B. A second roller pin 420B is then engaged by the second groove 415B. Varied shapes of the grooves 415 on the scroll cam 405 can allow for changing speed and acceleration during motion, which, as noted above, can be particularly important with continuous drive systems and, in particular, a system where both the scroll cam 405 and the pick and place 410 are driven by a single drive (discussed below). The use of two or more grooves 415 with two or more cam followers 420 also provides for additional stability in positioning the moving elements 50 because the cam grooves 415 and the cam followers 420 can be positioned such that each cam groove 415 applies pressure on a different side of the respective cam follower 420 such that there will be less play of the cam followers 420 within the grooves 415.

The intended benefits include:
a. good tolerance position repeatability due to the use of two grooves 415;
b. reduction in wear providing a longer life of cam and roller pins; and
c. scroll cam can be more easily designed to suit required pitch and motion profile required (e.g. pallet acceleration and velocity, continuous motion vs. pallet dwell time in station).

An additional benefit of the use of two or more cam grooves 415 and cam followers 420 is the ability of the scroll cam 405 to pull the moving element 50 off of the powered track section 35 by engagement with the first (i.e. forward) cam follower 420A and then, in turn, "push" the moving element 50 onto a subsequent powered track section 35 or the like by continuing to apply forward force to the moving element 50 via the second cam follower 420B even after the first cam follower 420A has disengaged. Although not shown, it will be understood that the first and second cam followers 420A and B may in fact be positioned on an extension slightly ahead of or behind the moving element, depending on the particular use of the system.

Figure 12A:
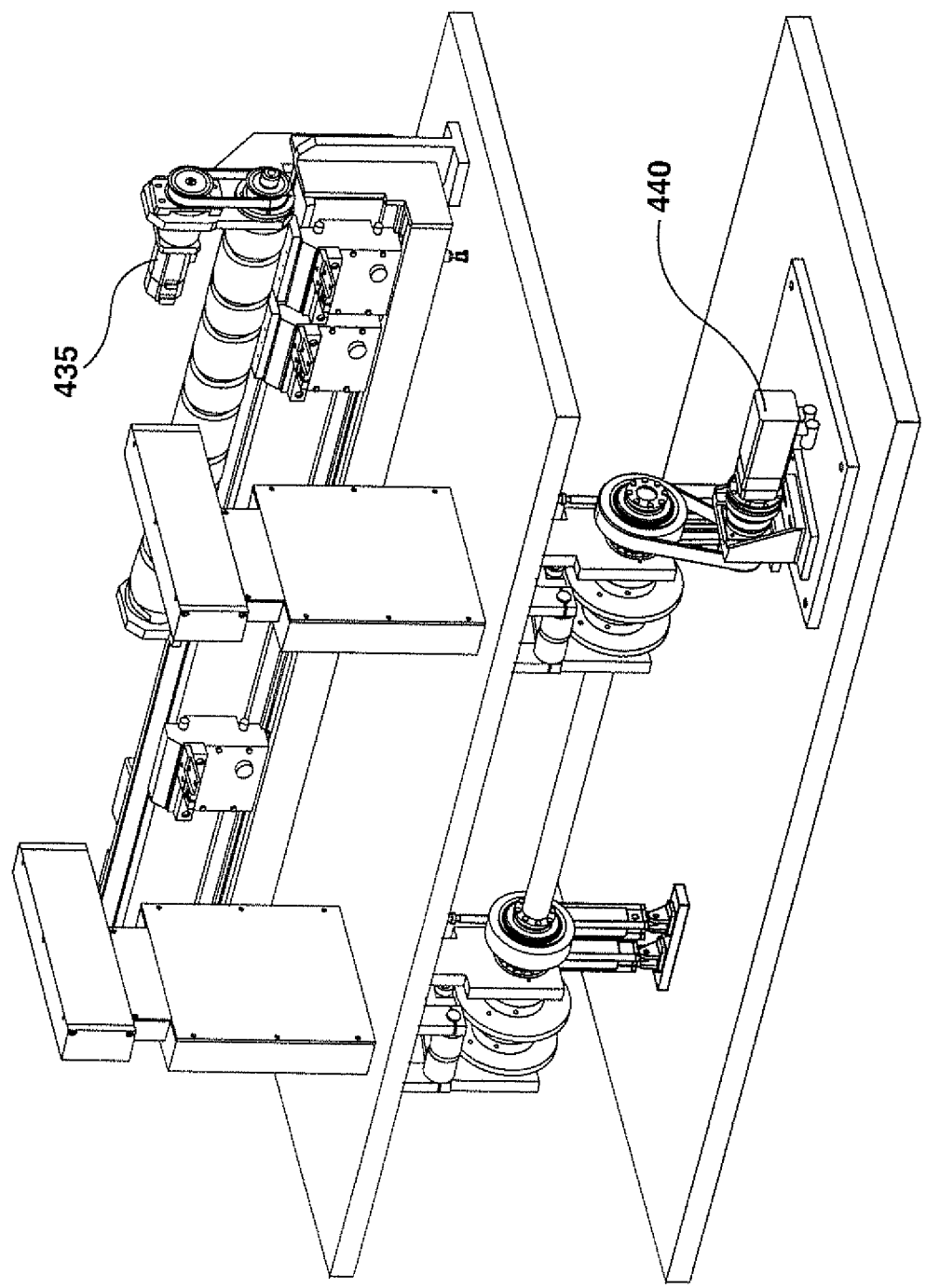
FIGS. 12A and 12B illustrate a dual drive scroll cam and pick and place system.
Figure 12B:
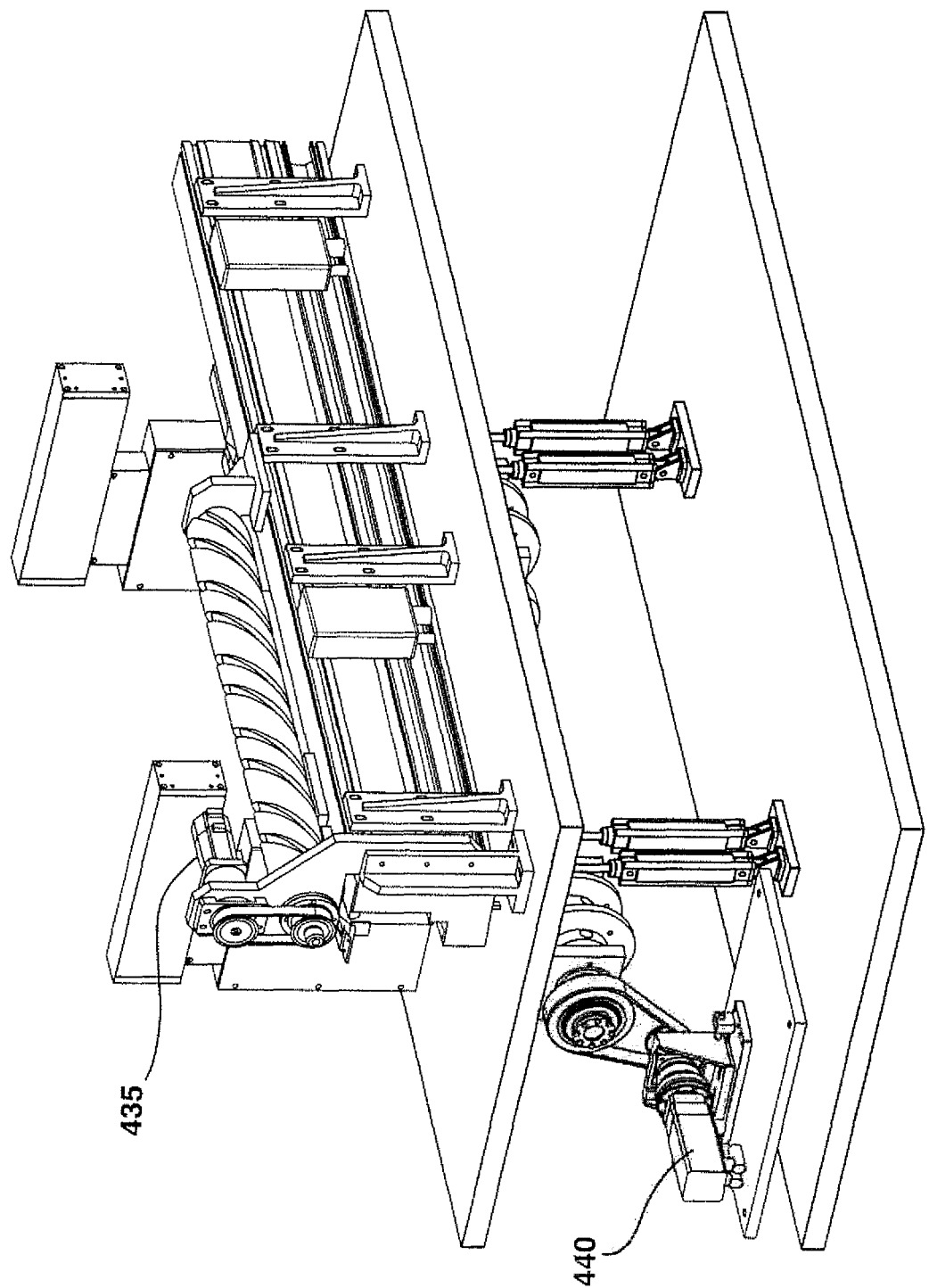

As described above, a plurality of drives may be used for driving the scroll cam 405 and pick and place units 410 (one or more for the scroll cam 405, one or more for the pick and place units 410). The multiple drive solution offers more flexibility for the operation of the pick and place handling, for instance if a longer stoppage of a pallet on the cam driven section is necessary. One example of a dual drive is shown in further detail in FIGS. 12A and 12B. In this case, the scroll cam drive 435 can be stopped while the pick and place drive 440 continues to operate. As noted above, a single (common) drive solution can enable a stoppage of the pallet but generally only for a time period less than one single rotation of the scroll cam (realized through the course/shape of the cam grooves 415. Multi drive systems need to be synchronized via the PLC. In some cases, using servo motors as drive sources for the pick and place units 410 can enable the PLC at any moment to "know" the current position of the moving element 50 and the pick and place unit 410. When using multiple drives, intended benefits include:
a. Flexibility to de-couple zones without additional cost of decoupling drives and the like. The decoupling can be realized by simple "switching off" the respective zone/station. Not necessary to de-couple by mechanical means.

Figure 13A:
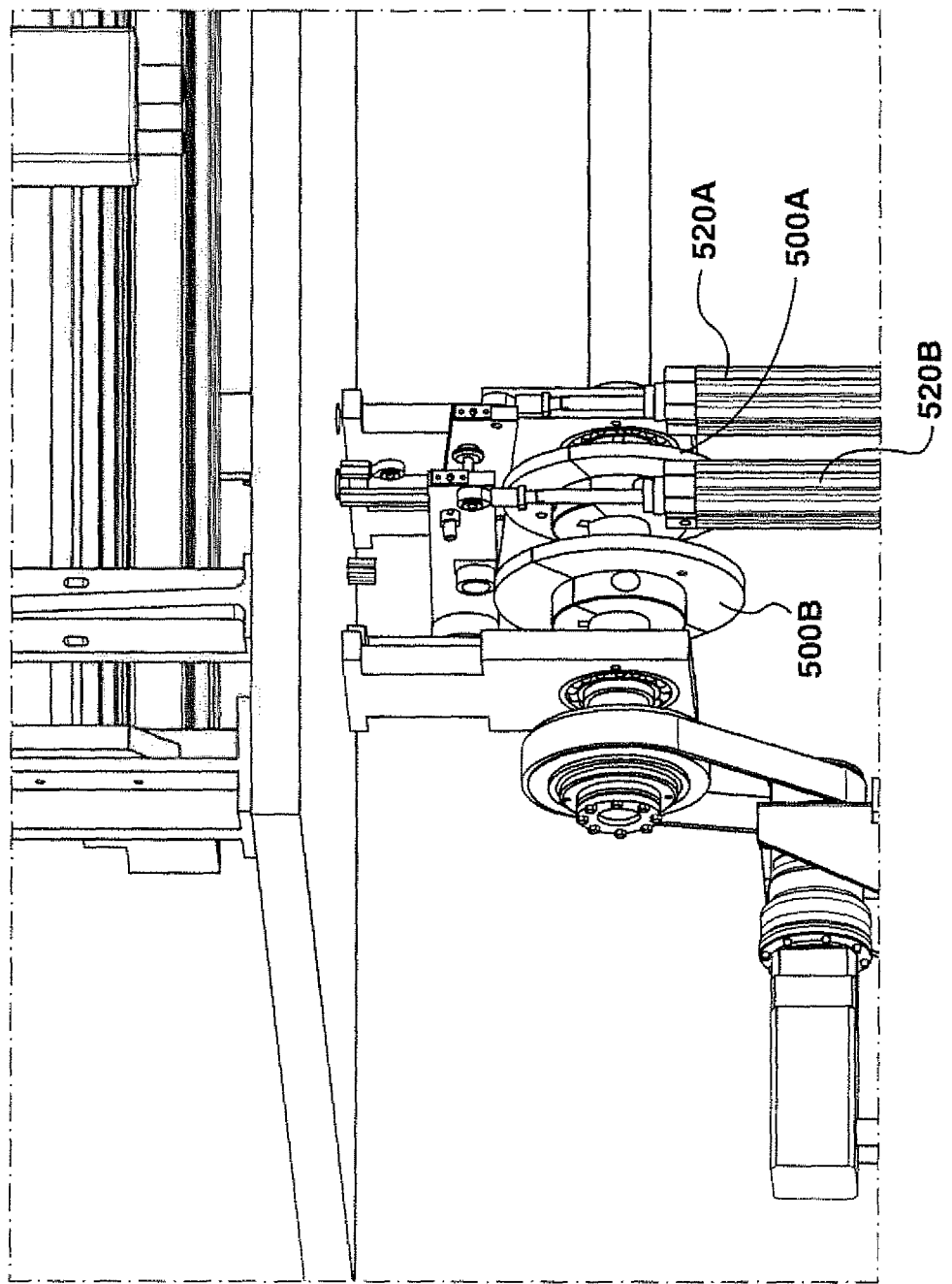
FIG. 13A illustrates a cam drive system for a pick and place device.
Figure 13B:
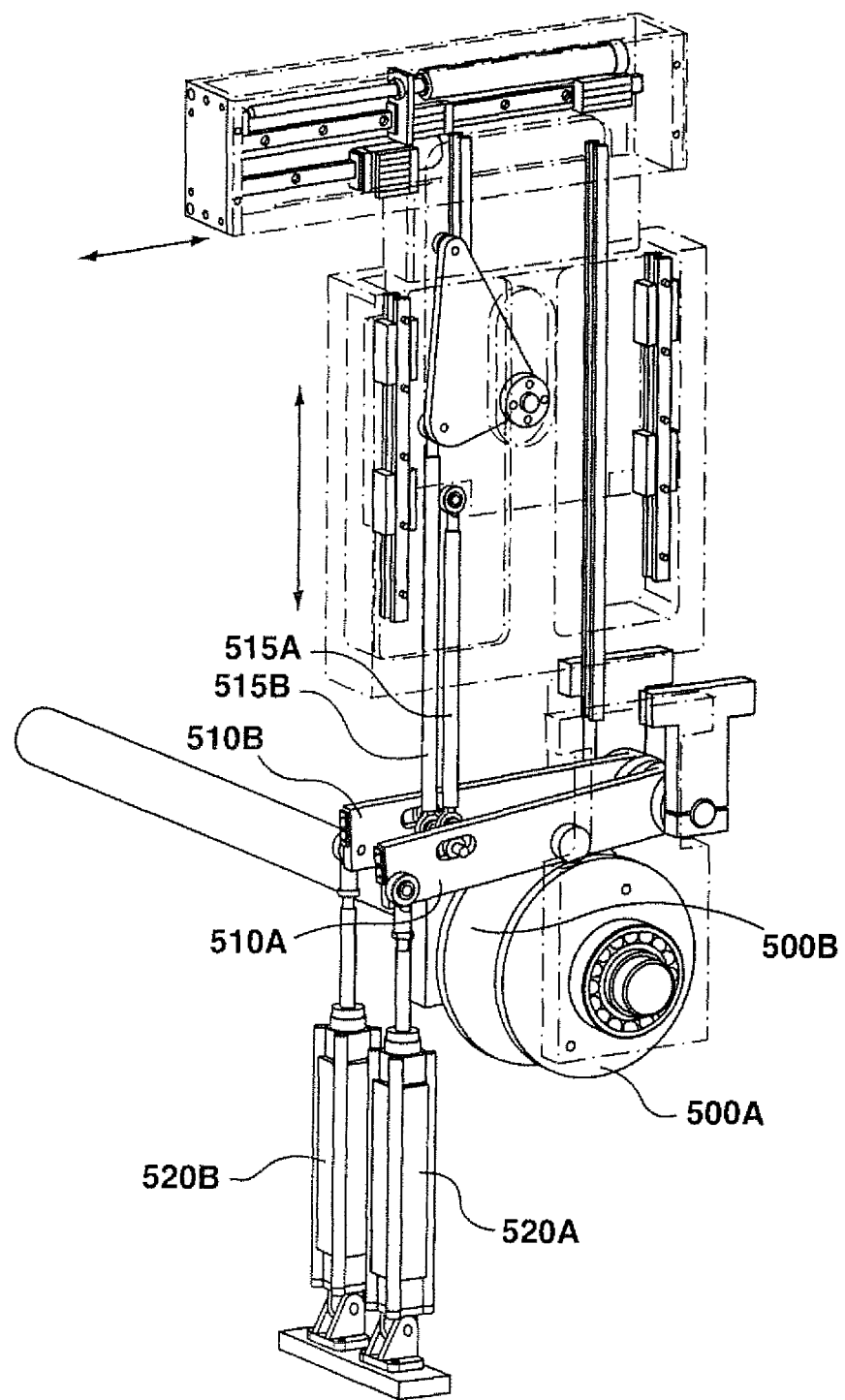
FIG. 13B shows additional detail related to the cam drive system of FIG. 13A.
Figure 13C:
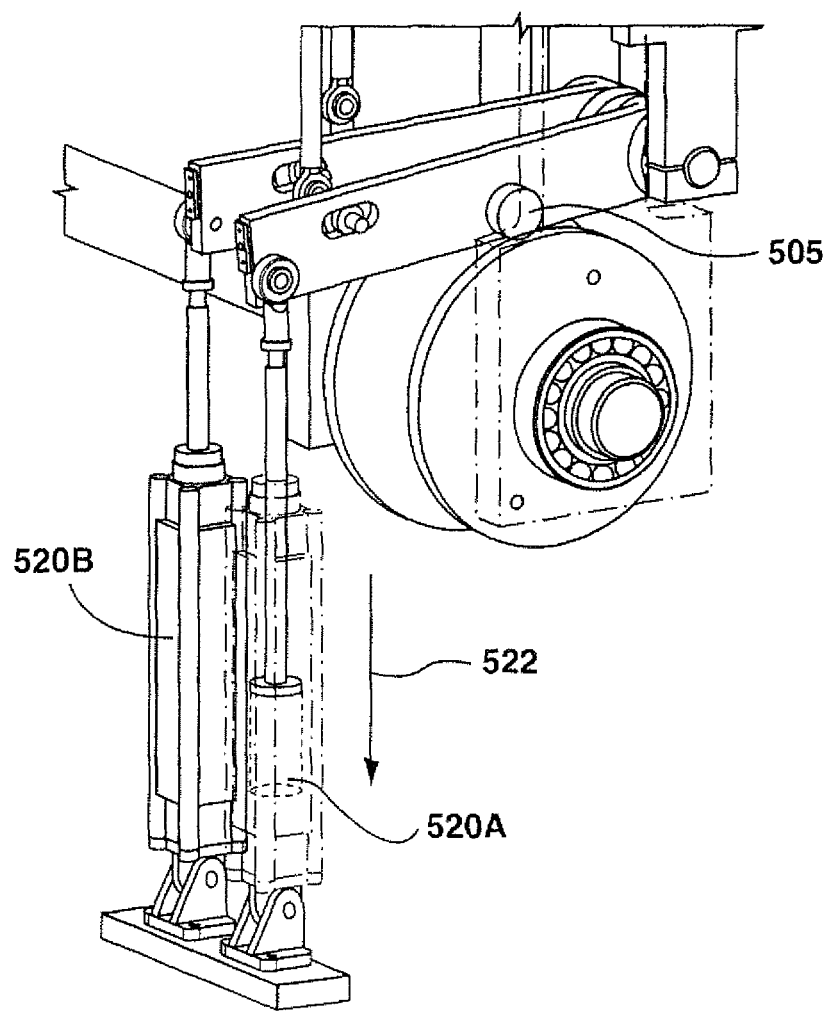
FIGS. 13C and 13D illustrate the function and principle of engagement and disengagement of cam follower levers (coupling and de-coupling of stations/zones)
Figure 13D:
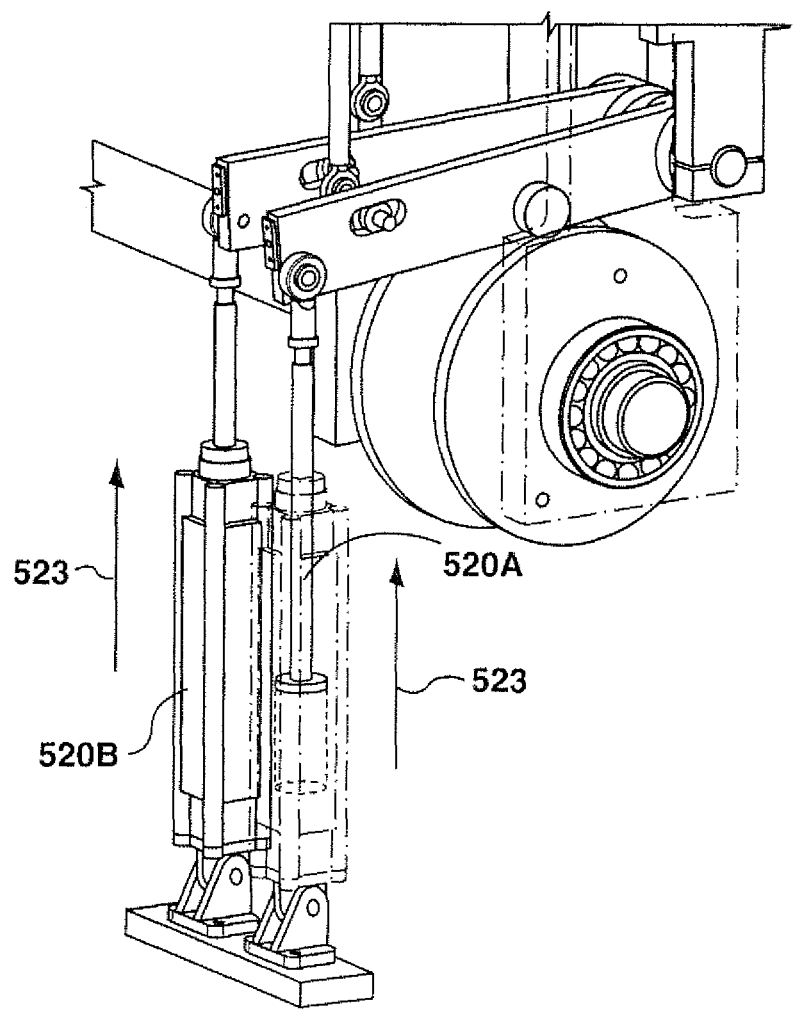

One example of a pick and place drive 440 involves a cam driven pick and place as shown in more detail in FIG. 13A-13D. In this case, rotating cams 500A and 500B drive horizontal and vertical motion, respectively. The rotating cams 500A and 500B drive cam followers 505 (only 505A is shown), which are supported by cam levers 510A and 510B. The cam levers 510A and 510B are connected transmission systems 515A and 515B to transmit the motion into the appropriate horizontal and vertical pick and place motion. The cam levers 510A and 510B are also connected with cylinders 520A and 520B, for example, a pneumatic cylinder or the like. The pneumatic cylinder 520A and 520B act as a spring to maintain the cam follower 505A (via the cam lever 510A and 510B) in contact with the rotating cams 500A and 500B. FIG. 13B illustrates the functional principle of the pick and place unit. Coupling and de-coupling of the pick and place unit 410 is performed pneumatically by extending or retracting the cylinder 520A or 520B with pressurized air. When engaged, the cylinder 520A or 520B pulls the lever down to the rotating cam 500A or 500B but also functions as an air spring due to the compressibility of the air in the cylinder 520A or 520B. FIGS. 13C and 13D illustrate the use of the cylinder 520A and 520B as an air spring (downward arrow 522) or to disengage the pick and place (upward arrows 523). Intended benefits of this system include:
a. reduced wear through roller follower 505A to hardened rotating cam 500A (FIG. 13b); and
b. ability to de-activate pick and place motion via programmable control (the pneumatic cylinder can be extended to disengage the cam and thereby stop pick and place motion). FIGS. 13C and 13D illustrate how engagement/disengagement of the cam lever/cam follower is realized. A PLC may control the pneumatic cylinder depending on the pick and place requirements for the processed product.

Figure 13E:
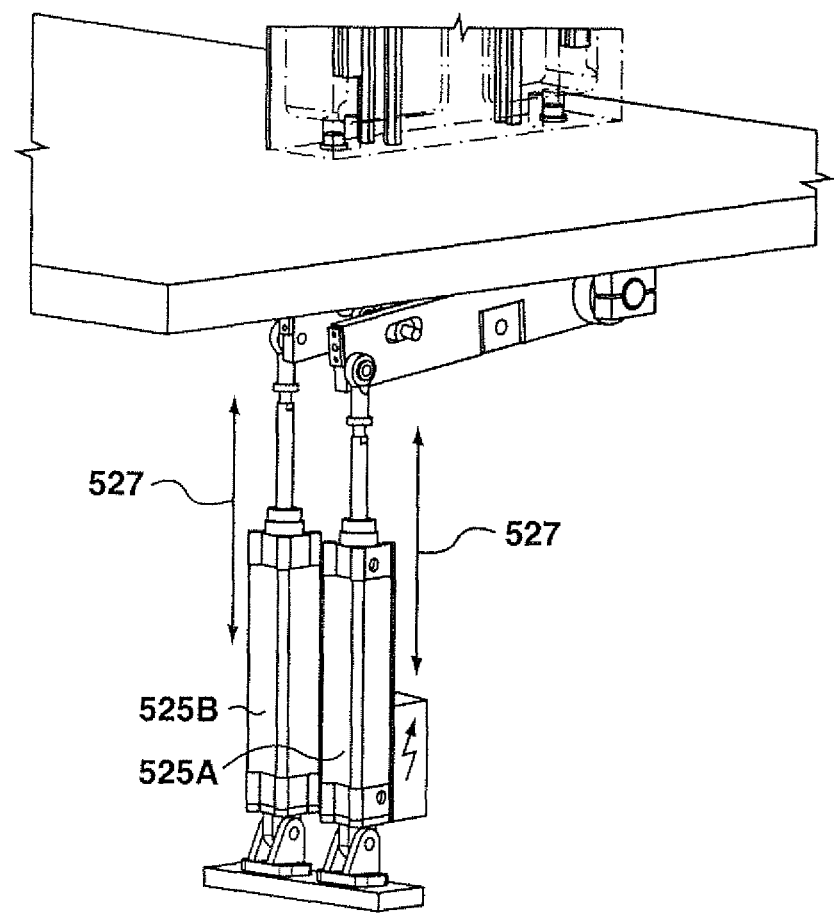
FIG. 13E illustrates the substitution of cam discs by electrically driven actuators.

Another example of a pick and place drive is a linear actuated pick and place (FIG. 13E). As shown in FIG. 13E, linear actuators (servo or otherwise) 525A and 525B are placed at the location of the pneumatic cylinder and the rotation cams 500A and 500B are removed. In this case, the pick and place is driven by the linear actuators 525A and 525B such that adjustment of the x and y dimensions of the pick and place movement (see arrows 527) can be performed easily via computer control of the linear actuators 525A and 525B. Intended benefits include:
a. Programmable vertical and horizontal motion providing the ability to rapidly develop pick and place motion profiles without machined cam profiles;
b. Programmable flexibility to change pick and place vertical and horizontal motion for different product or processing requirements without having to change out cams.

In this example, the linear actuators 525A and 525B may alternatively be used only initially to allow for fast, efficient adjustment of the pick and place movement while developing a movement profile. Following adjustments made using the linear actuators 525A and 525B a hardware cam can be formed based on the finalized movement profile and the hardware cam can then be put in place to drive the pick and place with pneumatic cylinders 520A and 520B replacing the linear actuators 525A and 525B once the optimal cam profile has been developed. The initial use of the linear actuators 525A and 525B helps to avoid the need to rework or waste cam material (due, for example, to re-cutting the cam for each adjustment) while developing the most appropriate cam profile for the required motion.

In some cases, it may be less desirable to replace the linear actuators 525A and 525B with a conventional cam system. For example, the programmability of the linear actuators 525A and 525B may provide additional benefits for adjusting the movement profile in relation to other variables that may change in the manufacturing environment over time. If a change is made in the processing of a product, the programmability of the linear actuators 525A and 525B can be used to adjust the pick and place motion to compensate. In a medical product/device marketplace where strict validation requirements are in place for manufacturing, if the programmable aspect of the linear actuators 525A and 525B has been validated in advance, the whole process may not need to be re-validated because of the small change. Another advantage is the increased flexibility regarding type changes and type variety which will be possible by adjusting programming or even selection of the respective production recipe including an appropriate motion profile. Using linear actuators 525A and 525B in the pick and place unit 410 on an ongoing basis may also enable vision controlled pick and place control, for example, it may be possible to include a vision system that provides feedback to the linear actuators 525A and 525B to adjust the movement of the pick and place based on a visually determined location of a part. Such a system may be used to increase accuracy of gripping processes when a part's geometry or position on a pallet differs from pallet to pallet.

Figure 14A:
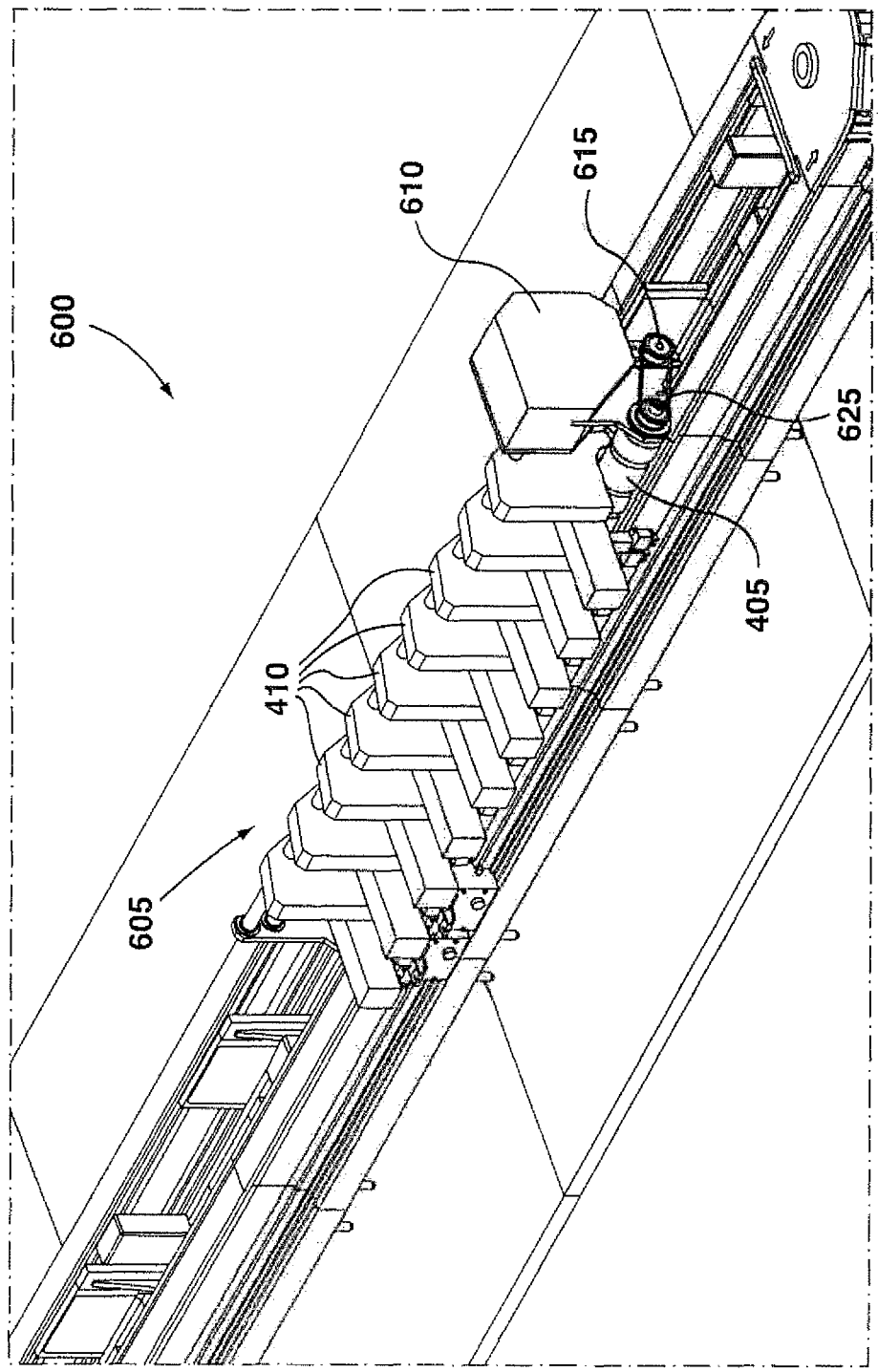
Figure 14B:
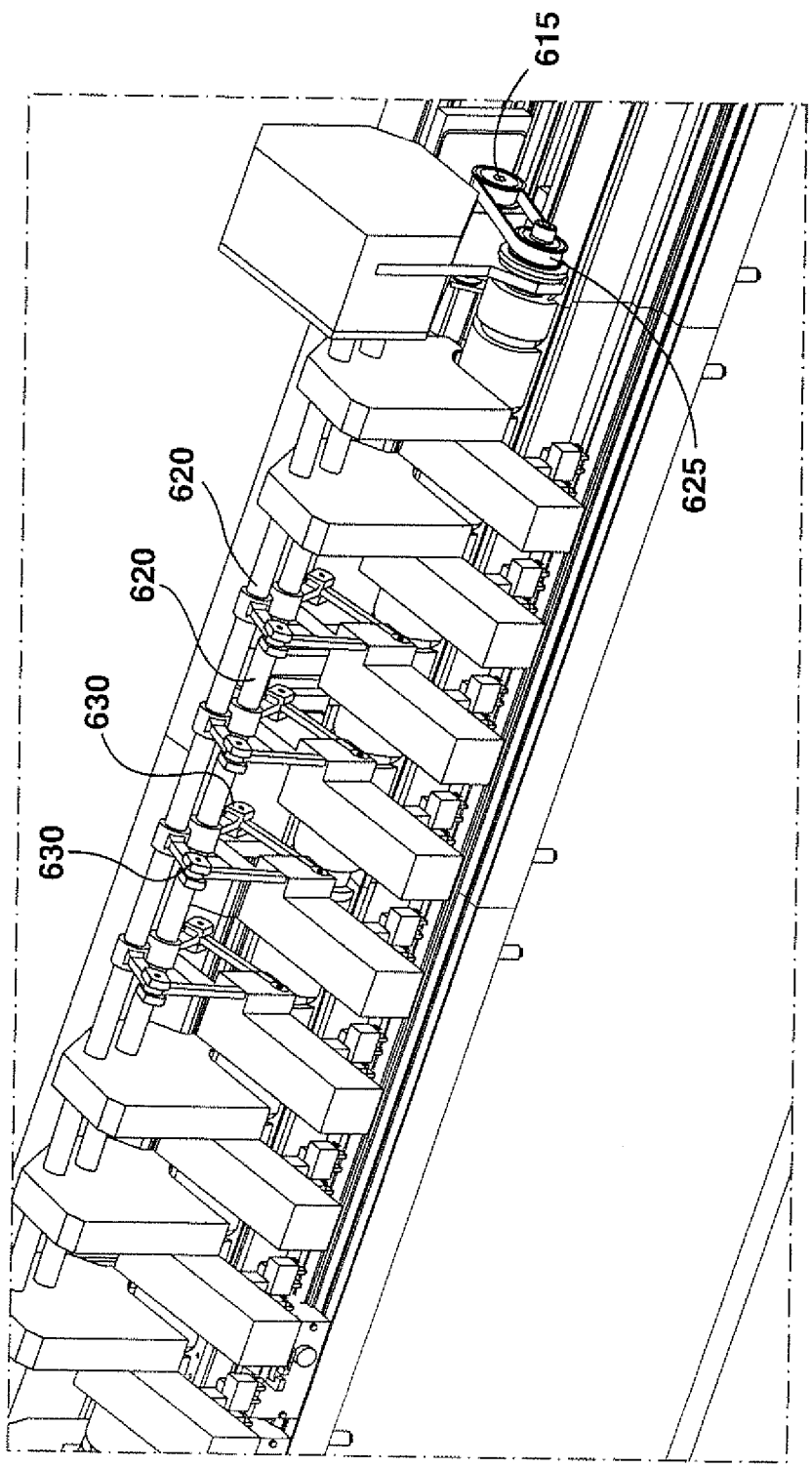
Figure 14D:
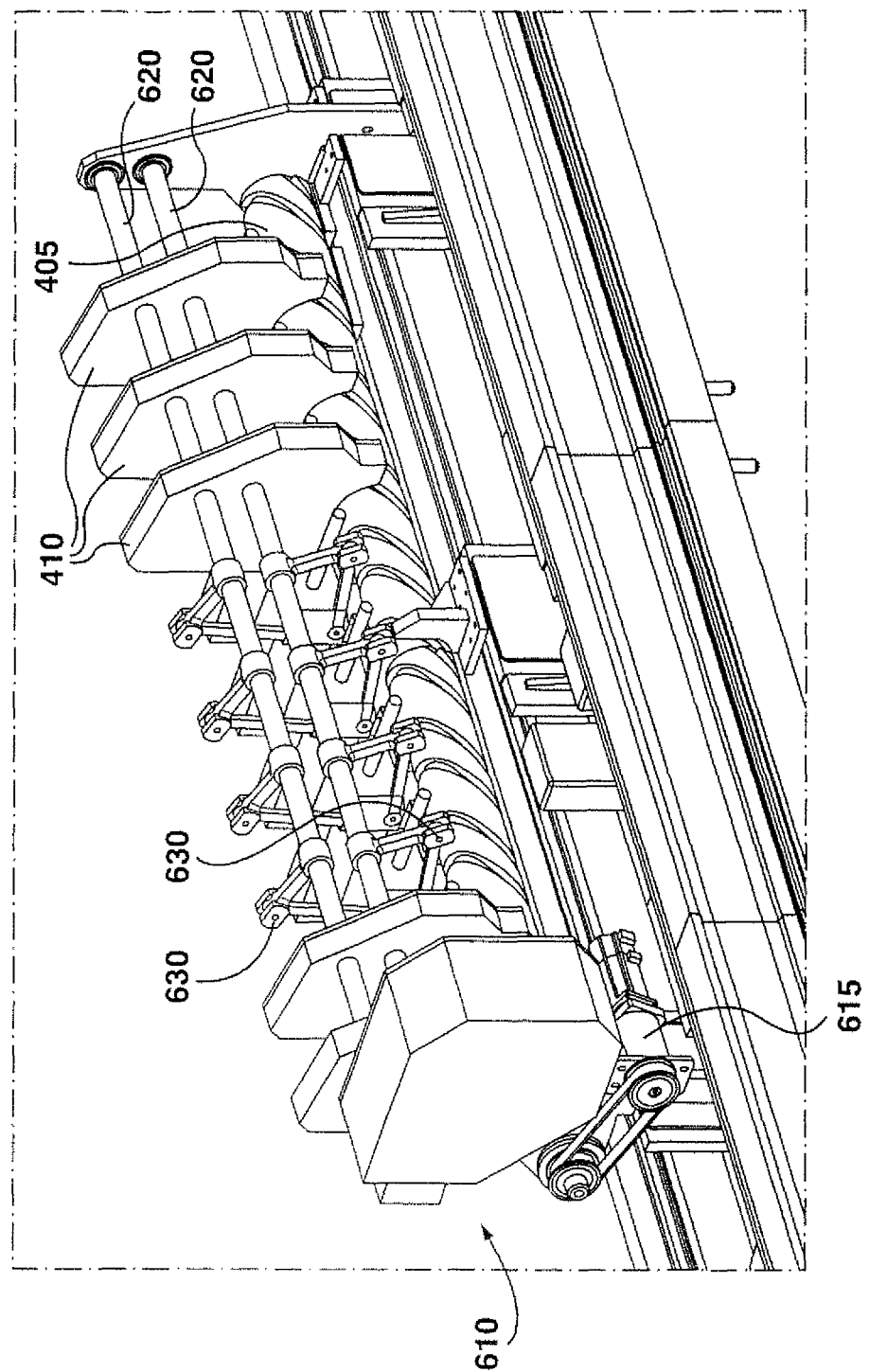

Also as described above, a single drive may be used for both the scroll cam 405 and pick and place units 410. FIGS. 14A, 14B, 14C and 14D show an example of a single drive system 600 in which both the scroll cam 405 and a pick and place system 605 are driven by a single drive 610. In this case, the pick and place system 605 includes a plurality of top mounted pick and place units 410. As shown in FIGS. 14B-14D, the single drive 610 of this embodiment uses dual shaft motion control. In particular, the single drive 610 uses a gear box (not shown in detail) that is configured such that a drive motor 615 drives both the pick and place system 605 via two drive shafts 620 and the scroll cam 405 via a belt 625. In this case, the drive shafts 620 can be geared with the single drive 610 such that they do not fully rotate but articulate through an arc range of motion (back and forth) and provide motion to linkages 630 to drive each pick and place unit's 410 horizontal and vertical motion. Intended benefits of this arrangement include:

a. reduced drive cost with single drive 610 driving all pick and place units 410 and scroll cams 405 in multiple zones;
b. reduced programming as moving element 50 motion and cam pick and place units 410 are mechanically coupled;
c. ease and flexibility of positioning pick and place units 410 anywhere along the drive shafts 620 resulting in fast set-up and quick re-configuration;
d. modular to re-position entire set of pick and place units 410 anywhere along unpowered track section 35';
e. reduced footprint consuming less space as compared to alternative pick and place configurations; and
f. lower cost pick and place.

While the single drive system 605 has been described in relation to use with an unpowered track section 35', it will be understood that this functionality may be used with many types of conveyor systems that make use of a scroll cam 405 and pick and place units 410. Further, it will be understood that, while the term pick and place has been used in the above embodiments, other types of appropriate workstations may also be implemented in place of the pick and place units 410.

The embodiments herein have been disclosed with a certain degree of particularity for the purpose of description but not of limitation. Those skilled in the art will appreciate that numerous modifications and variations can be made to the embodiments without departing from the spirit and scope of the application.

While the above description provides examples of one or more processes or apparatuses, it will be appreciated that other processes or apparatuses may be within the scope of the disclosure. It will also be understood that the processes and apparatuses may be implemented using hardware or software components or an appropriate combination thereof. Software may be provided as instructions on a physical computer medium or the like for execution on a processor of a computing device.

We claim:

1. A modular conveyor system comprising:
a plurality of moving elements;
at least one linear drive track section having an electromagnetic linear drive for independently controlling and independently moving the moving elements along the linear drive track section; and
at least one scroll cam track section connected to the linear drive track section, the at least one scroll cam track section having a scroll cam drive system and having the same configuration as the linear drive track section, wherein the moving elements are controlled and moved along the track section at variable speeds by the scroll cam drive system;
wherein the scroll cam drive system comprises:
a cylindrical cam;
a plurality of cam grooves formed on the cylindrical cam;
a drive system for rotating the cylindrical cam; and
each moving element comprises:
a plurality of cam followers;
wherein the plurality of cam grooves are configured to contact with respective ones of the plurality of cam followers to move the moving elements, and wherein at least one of the cam followers remains in contact with the respective cam grooves for moving the moving elements after at least one of the other cam followers has separated from the respective cam grooves.

2. The modular conveyor system of claim 1, further comprising a control system for monitoring the movement of moving elements, wherein the control system comprises a moving element tracking system comprising:
an encoder strip provided to the moving element; and
a plurality of encoder read heads provided to the track section and configured to read the encoder strip as moving elements move past the location of the encoder read heads.

3. The modular conveyor system of claim 1, wherein the cam grooves comprise at least one dead zone configured to provide a period in which a moving element is not driven even though the scroll cam is rotating.

4. A scroll cam conveyor system comprising:
a scroll cam comprising:
a cylindrical cam;
a plurality of cam grooves formed on the cylindrical cam;
a drive system for rotating the scroll cam; and
a moving element comprising:
a plurality of cam followers;
wherein the plurality of cam grooves are configured to contact with respective ones of the plurality of cam followers to move the moving element, and wherein at least one of the cam followers remains in contact with the respective cam grooves for moving the moving element after at least one of the other cam followers has separated from the respective cam grooves.

5. The scroll cam conveyor system of claim 4, wherein the cam grooves comprise at least one dead zone configured to provide a period in which a moving element is not driven even though the scroll cam is rotating.

6. The scroll cam conveyor system of claim 4, further comprising a control system for monitoring the movement of moving elements, wherein the control system comprises a moving element tracking system comprising:

an encoder strip provided to the moving element; and a plurality of encoder read heads provided to the track section and configured to read the encoder strip as moving elements move past the location of the encoder read heads.

\* \* \* \* \*